(12) United States Patent
Papsdorf

(10) Patent No.: US 9,340,364 B2
(45) Date of Patent: May 17, 2016

(54) AUTOMATED ADJUSTMENT SYSTEM FOR STAR WHEEL

(71) Applicant: The Procter & Gamble Company, Cincinnati, OH (US)

(72) Inventor: Clifford Theodore Papsdorf, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 14/340,600

(22) Filed: Jul. 25, 2014

(65) Prior Publication Data

US 2014/0343725 A1    Nov. 20, 2014

Related U.S. Application Data

(63) Continuation of application No. 12/775,918, filed on May 7, 2010, now Pat. No. 8,813,950.

(51) Int. Cl.
*B65G 47/00* (2006.01)
*B65G 29/00* (2006.01)
*B65G 47/84* (2006.01)

(52) U.S. Cl.
CPC .............. *B65G 29/00* (2013.01); *B65G 47/846* (2013.01); *B65G 2812/14* (2013.01)

(58) Field of Classification Search
CPC .. B65G 47/486; B65G 47/487; B65G 47/488; B65B 59/005
USPC .................................. 198/473.1, 474.1, 617
See application file for complete search history.

(56) References Cited

U.S. PATENT DOCUMENTS 1,981,641 A    11/1934  O'Fallon
2,156,020 A    4/1939   Lathrop
(Continued)

FOREIGN PATENT DOCUMENTS

DE    19903319 A    8/1999
EP    0366225 A1   5/1990
(Continued)

OTHER PUBLICATIONS

Author unknown, "Brochure for Multi-Format Rotary Monobloc Machine MRM-900", published by TecnoFluss, Varallo Pombia, Italy, date of first publication unknown, available on internet as of Mar. 2011.

(Continued)

*Primary Examiner* — Joseph Dillon, Jr.
(74) *Attorney, Agent, or Firm* — Jeffrey V Bamber; James C Vago

(57) ABSTRACT

A universally adjustable star wheel for conveying articles on an automated handling line is disclosed. In one embodiment, the adjustable star wheel includes rotatable elements that are configured to rotate around a central axis. Each rotatable element has a central axis, a periphery, and at least one control surface for assisting in controlling the article being conveyed. The control surfaces on the rotatable elements are arranged to together form at least one pocket for the article, wherein the pocket has a width and a depth. The angle defining the control surface on at least one rotatable element is different from the angle of another rotatable element to form the depth of at least a portion of the pocket. In this embodiment, the boundaries of the pocket are configured solely by at least partially rotating at least some of the rotatable elements to adjust the location of the control surfaces of the different rotatable elements to form a pocket for the article being conveyed. An automated adjustment mechanism for adjusting a star wheel to accommodate different articles is also disclosed. The automated adjustment mechanism may be used with any suitable star wheel.

9 Claims, 19 Drawing Sheets

(56) References Cited

U.S. PATENT DOCUMENTS

| | | | |
|---|---|---|---|
| 2,324,312 A | 7/1943 | Meyer et al. | |
| 3,957,154 A | 5/1976 | Shiba | |
| 4,075,086 A | 2/1978 | Marsh et al. | |
| 4,124,112 A | 11/1978 | Mohney et al. | |
| 4,197,935 A * | 4/1980 | Aterianus | B65B 35/24 198/460.1 |
| 4,279,115 A | 7/1981 | Roberts et al. | |
| 4,921,093 A | 5/1990 | Peters et al. | |
| 4,932,517 A | 6/1990 | Johnson | |
| 5,029,695 A | 7/1991 | Kovara | |
| 5,046,599 A | 9/1991 | Hamano | |
| 5,058,731 A | 10/1991 | Corniani et al. | |
| 5,082,105 A | 1/1992 | Tincati | |
| 5,099,979 A | 3/1992 | Kehrel | |
| 5,246,314 A | 9/1993 | Smith et al. | |
| 5,291,988 A | 3/1994 | Leonard | |
| 5,322,160 A | 6/1994 | Markiewicz et al. | |
| 5,373,934 A | 12/1994 | Jackson et al. | |
| 5,540,320 A * | 7/1996 | Sarto | B67C 7/0046 198/473.1 |
| 5,542,789 A | 8/1996 | Aidlin et al. | |
| 5,551,555 A | 9/1996 | Gladieux et al. | |
| 5,581,975 A | 12/1996 | Trebbi et al. | |
| 5,590,753 A | 1/1997 | Bertschi et al. | |
| 5,711,411 A | 1/1998 | Zurweller | |
| 5,784,857 A | 7/1998 | Ford et al. | |
| 5,927,480 A | 7/1999 | McCaffrey et al. | |
| 5,967,295 A | 10/1999 | Ledingham | |
| 6,050,396 A | 4/2000 | Moore | |
| 6,059,096 A | 5/2000 | Gladieux | |
| 6,244,429 B1 | 6/2001 | Drewitz | |
| 6,302,258 B1 | 10/2001 | Verona | |
| 6,332,740 B1 | 12/2001 | Bernard et al. | |
| 6,360,880 B1 | 3/2002 | Quellette | |
| 6,378,695 B1 | 4/2002 | Rinne | |
| 6,578,702 B2 | 6/2003 | Falkowski | |
| 6,827,203 B2 | 12/2004 | Andreoli et al. | |
| 6,889,823 B2 | 5/2005 | Delaporte et al. | |
| 7,004,302 B1 | 2/2006 | Hensen | |
| 7,007,793 B2 | 3/2006 | Stocchi | |
| 7,134,540 B1 | 11/2006 | Marti Sala | |
| 7,207,428 B2 | 4/2007 | Huttner | |
| 7,398,871 B1 | 7/2008 | Basgil et al. | |
| 7,431,150 B2 | 10/2008 | Ranger | |
| 7,497,322 B2 | 3/2009 | Lanfranchi | |
| 7,520,380 B2 | 4/2009 | Ranger | |
| 7,610,785 B2 * | 11/2009 | Akami | B21D 43/003 198/468.2 |
| 7,617,926 B2 | 11/2009 | Jacob et al. | |
| 7,681,720 B2 | 3/2010 | Monti | |
| 7,735,636 B2 | 6/2010 | Lundberg | |
| 7,743,907 B2 | 6/2010 | Weinbrenner et al. | |
| 7,748,522 B2 | 7/2010 | Reiner | |
| 7,748,523 B2 | 7/2010 | Robertson | |
| 7,815,041 B2 | 10/2010 | Guenther | |
| 7,954,625 B2 | 6/2011 | Dewert | |
| 7,967,127 B2 | 6/2011 | Spence et al. | |
| 8,002,107 B2 | 8/2011 | Balzarin et al. | |
| 8,006,826 B2 * | 8/2011 | Licht | B65G 47/848 198/428 |
| 8,025,141 B1 | 9/2011 | Bouldin | |
| 8,186,503 B1 | 5/2012 | Burchell et al. | |
| 8,235,202 B2 | 8/2012 | Schreiber | |
| 8,240,459 B2 | 8/2012 | Bernhard | |
| 8,418,836 B2 * | 4/2013 | Papsdorf | B65G 47/846 198/471.1 |
| 8,499,921 B1 * | 8/2013 | Orndorff | B65G 21/2072 198/479.1 |
| 8,561,783 B2 * | 10/2013 | McAllister | B65G 47/846 198/473.1 |
| 8,651,853 B2 * | 2/2014 | Dupuis | B29C 49/421 198/459.8 |
| 8,820,514 B2 * | 9/2014 | Papsdorf | 198/478.1 |
| 9,181,043 B1 * | 11/2015 | Goudy | B65G 29/00 |
| 2002/0092731 A1 | 7/2002 | Osterfeld et al. | |
| 2003/0106779 A1 | 6/2003 | Stocchi | |
| 2007/0271871 A1 | 11/2007 | Spence et al. | |
| 2008/0116042 A1 | 5/2008 | McAlister et al. | |
| 2010/0003112 A1 | 1/2010 | Rognoni et al. | |
| 2010/0192524 A1 * | 8/2010 | Rapparini | B65B 31/024 53/512 |
| 2010/0193331 A1 | 8/2010 | McAllister et al. | |
| 2011/0272245 A1 * | 11/2011 | Papsdorf | B65G 47/846 198/471.1 |
| 2011/0272246 A1 | 11/2011 | Papsdorf | |
| 2012/0211331 A1 * | 8/2012 | Simon | C03B 9/41 198/572 |
| 2013/0180830 A1 * | 7/2013 | Orndorff | B65G 21/2072 198/617 |
| 2013/0199894 A1 * | 8/2013 | Papsdorf | B65G 47/846 198/478.1 |
| 2013/0283731 A1 * | 10/2013 | Komp | B65B 5/06 53/268 |
| 2015/0158611 A1 * | 6/2015 | Kalany | B65B 35/26 53/443 |
| 2015/0344236 A1 * | 12/2015 | Papsdorf | B65G 29/00 198/473.1 |
| 2015/0344237 A1 * | 12/2015 | Papsdorf | B65G 29/00 198/473.1 |
| 2015/0344238 A1 * | 12/2015 | Goudy | B65G 29/00 198/473.1 |

FOREIGN PATENT DOCUMENTS

| | | |
|---|---|---|
| EP | 0355971 B1 | 11/1993 |
| EP | 0412059 B1 | 2/1994 |
| EP | 0401698 B1 | 8/1994 |
| EP | 0629569 A1 | 12/1994 |
| EP | 0659683 B1 | 4/1997 |
| EP | 0894544 A2 | 2/1999 |
| EP | 1975118 A1 | 10/2008 |
| EP | 1663824 B1 | 6/2009 |
| EP | 02159172 A1 | 3/2010 |
| JP | 11-11658 | 8/1982 |
| JP | 10035879 A | 2/1998 |
| JP | 10-338342 | 12/1998 |
| SE | 519716 C2 | 4/2003 |
| WO | WO-9412412 | 6/1994 |
| WO | WO2005/030616 A2 | 4/2005 |
| WO | WO2005/123553 A1 | 12/2005 |
| WO | WO2009/040531 A1 | 4/2009 |

OTHER PUBLICATIONS

International search report for case 11708 dated Jul. 12, 2011, 5 pages.

Zepf Technologies UK, "Global leader in container handling changepart technology", product brochure, 18 pages, Zepf Technologies UK, Cumbernauld, UK. (Describes equipment believed to have been sold more than one year before filing date.).

Flex-Line Automation Inc., Robo Guide Adjustable Guide Rail System, introduced at 2000 PMMI show, website: www.flex-lineautomation.com/robo-guide.htm, Chester, IL, USA.

All Office Actions in P&G case 11707D, U.S. Appl. No. 13/832,030.
All Office Actions in P&G Case 11707, U.S. Appl. No. 12/775,902.
All Office Actions in P&G Case 11708, U.S. Appl. No. 12/775,918.

* cited by examiner

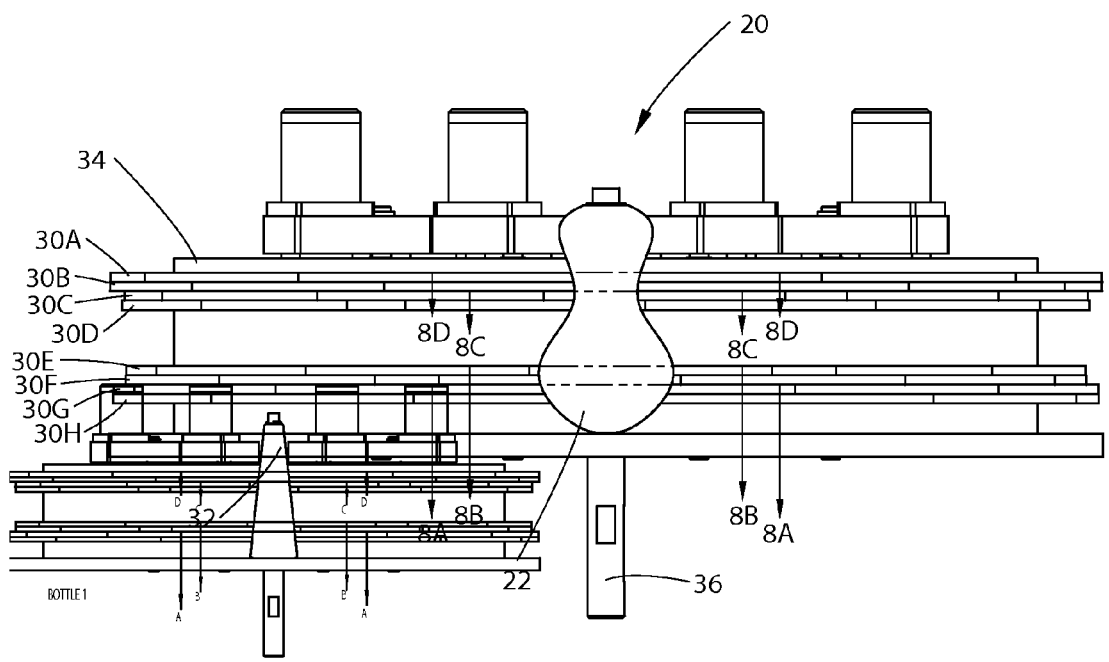
Fig. 8
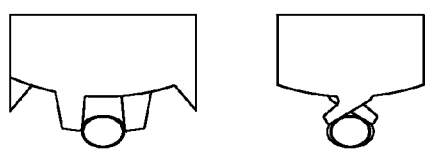 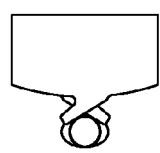 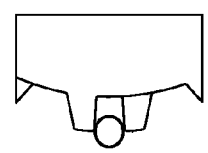
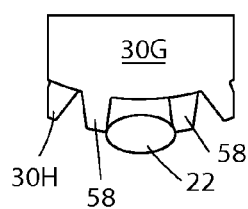 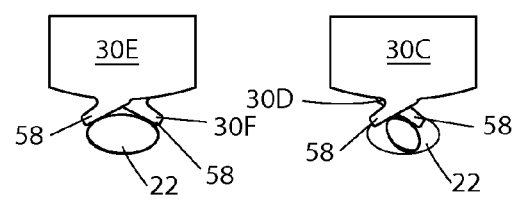 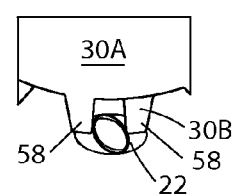 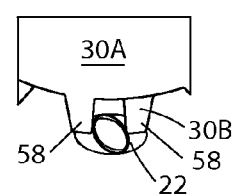
Fig. 8A    Fig. 8B    Fig. 8C    Fig. 8D

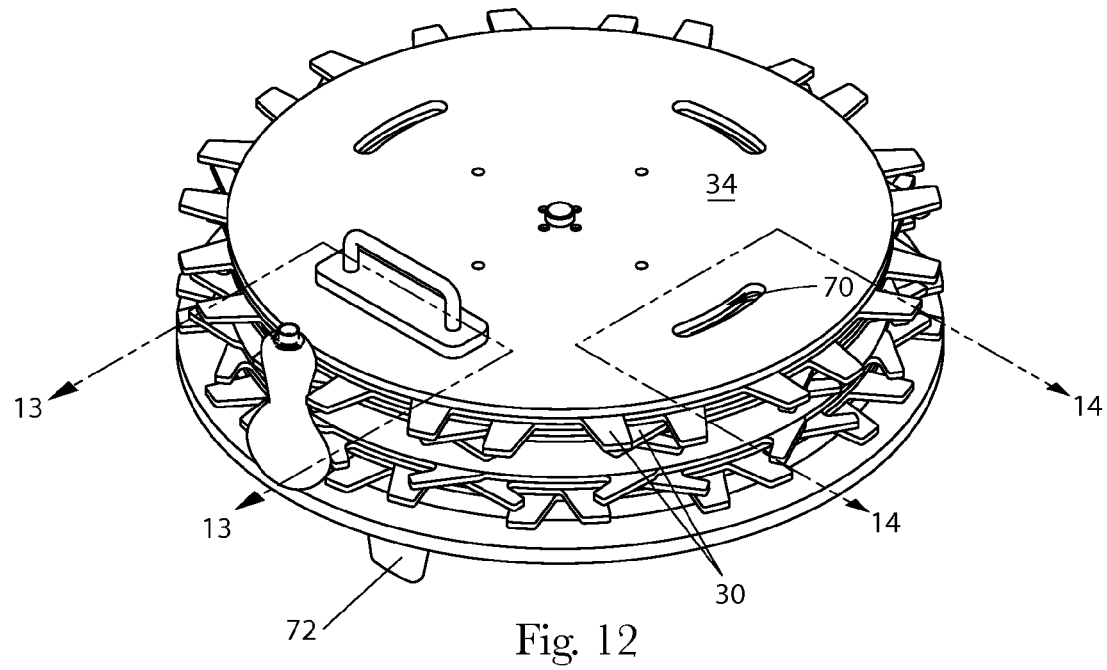
Fig. 12
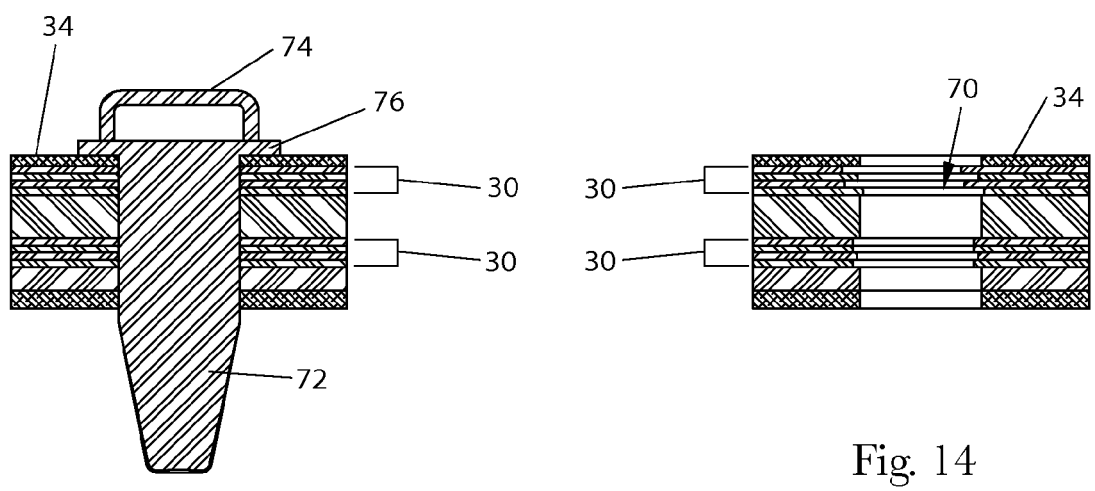
Fig. 13
Fig. 14

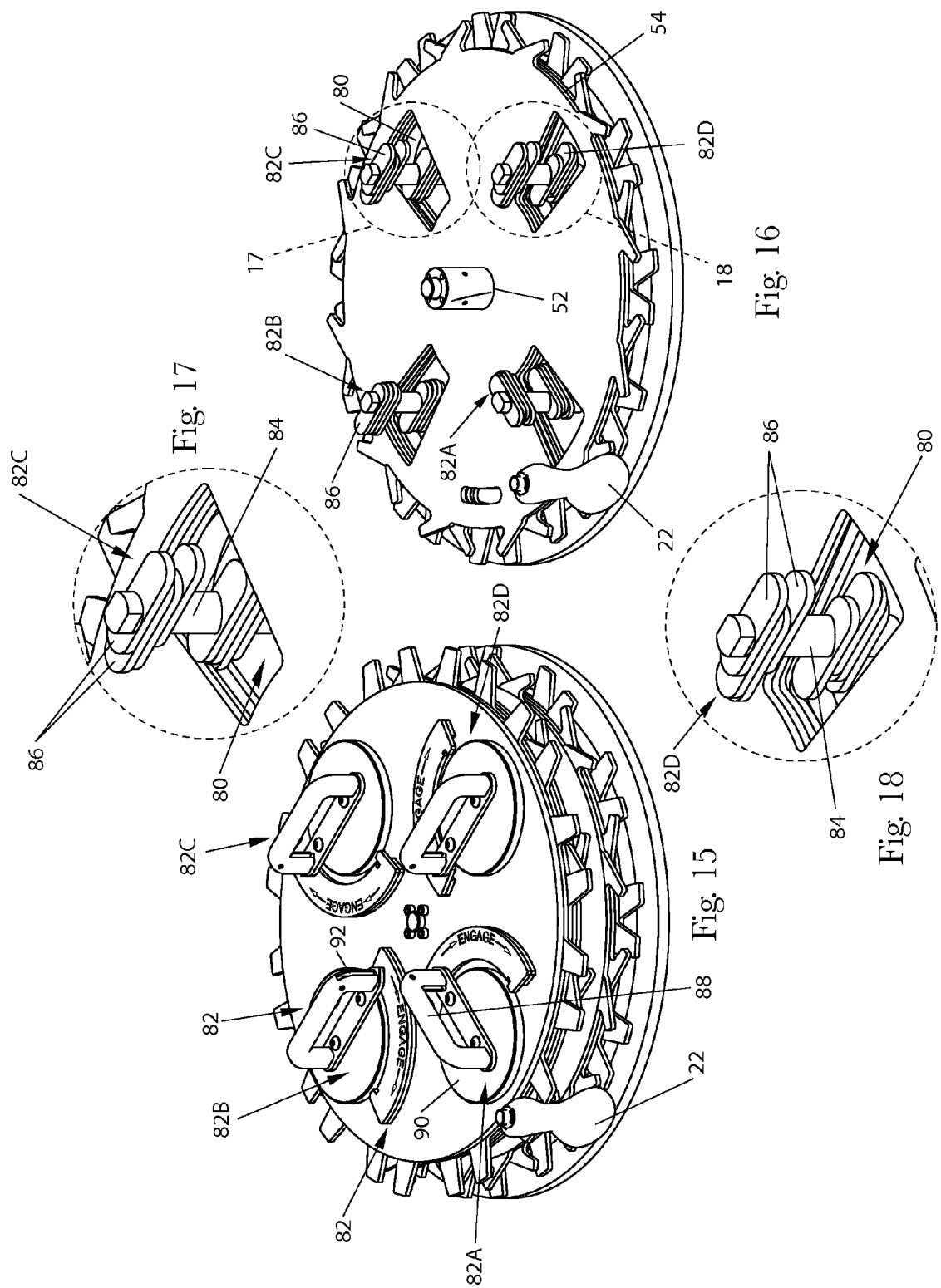

AUTOMATED ADJUSTMENT SYSTEM FOR STAR WHEEL

FIELD OF THE INVENTION

The present invention is directed to an adjustable star wheel conveyor for conveying articles on an automated handling line, and more particularly to an adjustable star wheel with relatively few moving parts that can accommodate a virtually unlimited number of size and shape articles. An automated adjustment mechanism for adjusting an adjustable star wheel to accommodate different articles is also disclosed.

BACKGROUND OF THE INVENTION

Star wheels are used on various types of automated handling lines to convey containers to and from, and within, various machines, such as rotary packaging machines. In particular, star wheels are used to convey containers between rectilinear conveyors to a rotating machine and back to a rectilinear conveyor. Such star wheels may be used with a number of containers that include bottles, cans and tins. The various rotary packaging machines may perform various functions, e.g. cleaning, filling, capping or labeling a container.

Star wheels are generally disk shaped and their periphery contains a plurality of recesses or pockets thereby forming a star-shape. Other star wheels have circular peripheries with projecting fingers to engage the containers, and the fingers lend a general star-shape to the star wheel. Star wheels rotate about a central axis and generally comprise a pair of disk-like plates centered on this axis. Recesses may be provided in the peripheries of the disks to form pockets for receiving containers therein. The star wheel is positioned on an automated handling line so that a container travelling down the handling line is received within a pocket as the star wheel rotates. The container is retained within the pocket as the star wheel rotates before being released at a defined point.

Containers are generally retained within a pocket by supporting the container between a pair of contact surfaces that urge the container against a guide rail that encircles at least part of the star wheel's periphery. A second type of star wheel provides an alternative form of support by providing pairs of jaws to grip the container about its sides. This design does not need disks to define peripheral recesses.

A star wheel may convey a container to a closely-defined point within a rotary packaging machine or along a closely-defined path through a rotary packaging machine. For example, the container may be a bottle with a narrow neck that is presented to a filling machine: when presented, the neck of the bottle must be on the correct path such that it passes exactly beneath a filling nozzle. Thus, it is important that the center of the container follows a predetermined path and that the position of the bottle in the direction of travel is accurately controlled.

In general, any automated handling line may be used to process containers of varying shapes and sizes. In the past, each star wheel could only handle containers of a specific shape and size, so this meant having to change the star wheel each time a different container was introduced onto a handling line. This is undesirable as it is both time consuming and necessitates having to keep a stock of different-sized star wheels. Attempts have been made to overcome this problem.

Such attempts are described in the patent literature, and include, but are not limited to devices described in: U.S. Pat. No. 1,981,641; U.S. Pat. No. 2,324,312; U.S. Pat. No. 3,957,154; U.S. Pat. No. 4,124,112; U.S. Pat. No. 5,029,695; U.S. Pat. No. 5,046,599; U.S. Pat. No. 5,082,105; U.S. Pat. No. 5,540,320; U.S. Pat. No. 5,590,753; U.S. Pat. No. 7,398,871 B1; U.S. 2007/0271871 A1; DE 19903319A; EP 0 355 971 B1; EP 0 401 698 B1; EP 0 412 059 B1; EP 0 659 683 B1; EP 0 894 544 A2; EP 1 663 824 B1; JP Publication JP 10035879 A; PCT WO 2005/030616 A2; PCT WO 2009/040531 A1. Adjustable guide rails are described the patent literature as well, including in the aforementioned U.S. Pat. No. 5,540,320 and PCT WO 2005/030616 A2, and in U.S. Pat. No. 7,431,150 B2 and PCT WO 2005/123553 A1.

However, such devices often have very complex mechanical arrangements for attempting to provide adjustability. Such mechanical arrangements frequently include piston type elements that move inwardly and outwardly to set the depth of the pocket for the articles being conveyed. Other devices have adjustable fingers with complicated mechanisms to adjust the orientation of the fingers. Still other devices have multiple rotating disks with locking pins that limit the size and shape of the pockets that can be formed for the articles being conveyed, particularly the depth of the pockets. The search for improved star wheels has, therefore, continued. In particular, it is desirable to provide a simpler device that is adjustable to fit more article shapes and sizes than prior devices, and can be automatically adjusted from a CAD program containing data on the shape of the article to be conveyed.

SUMMARY OF THE INVENTION

The present invention is directed to an adjustable star wheel conveyor for conveying articles on an automated handling line, and more particularly to an adjustable star wheel with relatively few moving parts that can accommodate a virtually unlimited number of size and shape articles.

There are numerous non-limiting embodiments of the present invention. In one non-limiting embodiment, the adjustable star wheel includes rotatable elements, such as disks that are configured to rotate around a central axis. Each rotatable element has a center, a periphery, and at least one control surface for assisting in controlling the article being conveyed. The control surfaces on the rotatable elements are arranged to together form at least one pocket for the article, wherein the pocket has a width and a depth. The angle defining the control surface on at least one rotatable element is different from the angle of another rotatable element to form the depth of at least a portion of the pocket. In this embodiment, the boundaries of the pocket are configured solely by at least partially rotating at least some of the rotatable elements to adjust the location of the control surfaces of the different rotatable elements to form a pocket for the article being conveyed.

An automated adjustment mechanism for adjusting an adjustable star wheel to accommodate different articles is also disclosed. The automated adjustment mechanism may be used with any suitable adjustable star wheel.

BRIEF DESCRIPTION OF THE DRAWINGS

The following detailed description will be more fully understood in view of the drawings in which:

FIG. 7A shows the location of the pinion in the opening in the disk. FIG. 7A also shows a schematic cross-section of the portion of a bottle that is contacted by the contact surface on the first disk.

FIG. 8 is a side view of the adjustable star wheel in FIG. 3 with the guide rail removed and one bottle in place in a pocket.

FIG. 8A is a fragmented plan view showing one pair of disks of the star wheel shown in FIG. 8 contacting a bottle (which is shown in cross-section).

FIG. 8B is a fragmented plan view showing another pair of disks of the star wheel contacting the bottle at a different location on the bottle.

FIG. 8C is a fragmented plan view showing another pair of disks of the star wheel contacting the bottle at another different location on the bottle.

FIG. 8D is a fragmented plan view showing another pair of disks of the star wheel contacting the bottle at another different location on the bottle.

FIG. 12 is a perspective view similar to FIG. 11 showing the tapered pin inserted into one of the slots in the disks.

FIG. 13 is a cross-sectional view taken along lines 13-13 of FIG. 12.

FIG. 14 is a cross-sectional view taken along lines 14-14 of FIG. 12.

FIG. 15 is a perspective view of a star wheel conveyor having another alternative type of adjustment mechanism in the form of quick change cams or keys.

FIG. 16 is a perspective view of a portion of the star wheel shown in FIG. 15, with the top four disks, top plate, and intermediate plate removed.

FIG. 17 is an enlarged perspective view of one of the cams shown in FIG. 16 that is in an engaged position.

FIG. 18 is an enlarged perspective view of one of the cams shown in FIG. 16 that is in a disengaged position.

Figure 1:
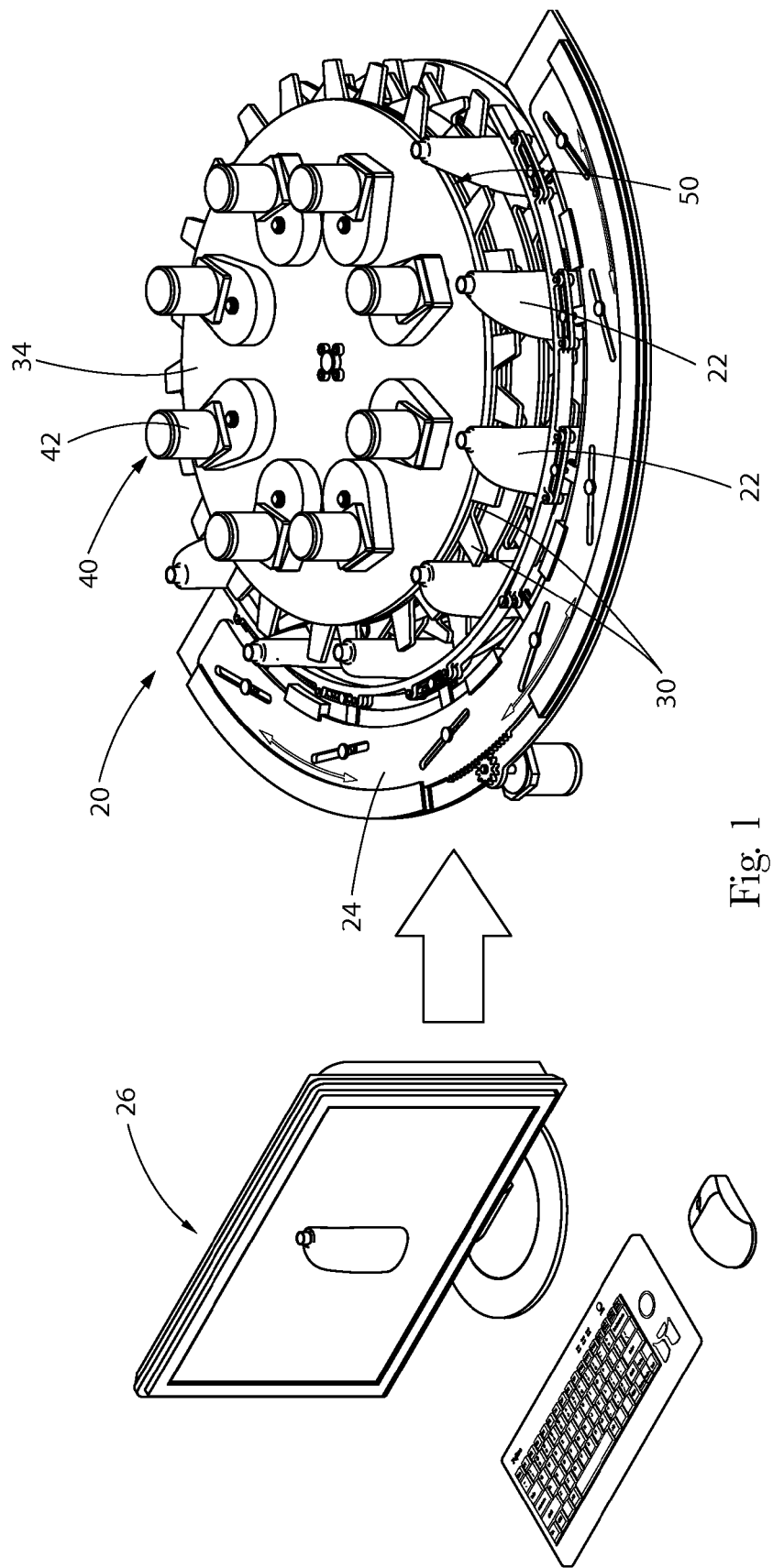
FIG. 1 is a perspective view showing one embodiment of an adjustable star wheel together with an adjustable guide rail and a computer for automatically adjusting the star wheel to fit different articles.

The embodiment of the system shown in the drawings is illustrative in nature and is not intended to be limiting of the invention defined by the claims. Moreover, the features of the invention will be more fully apparent and understood in view of the detailed description.

DETAILED DESCRIPTION

The present invention is directed to an adjustable (or "reconfigurable") star wheel conveyor (or simply an "adjustable star wheel" or "star wheel"). The adjustable star wheel may have relatively few moving parts and may be universally accommodate a virtually unlimited number of size and shape articles. Automated and manual adjustment mechanisms for adjusting an adjustable star wheel to accommodate different articles are also disclosed.

FIG. 1 shows one non-limiting embodiment of a system comprising an adjustable star wheel conveyor 20 for conveying three dimensional articles 22 around an arcuate path. In the embodiment shown in FIG. 1, the system comprises the adjustable star wheel 20, an adjustable guide rail assembly (or "adjustable guide rail") 24, and an automated adjustment mechanism that includes a computer 26 for adjusting the adjustable star wheel 20 and/or adjustable guide rail 24 to accommodate different size and/or shape articles 22. The automated adjustment mechanism may be used with any suitable adjustable star wheel.

The star wheel 20 can be used to convey numerous different types of three dimensional articles 22. Such articles include, but are not limited to: bottles, cans, containers, razors, razor blade heads and handles, tampon tubes, and deodorant stick containers. While the star wheel 20 can easily transport conventionally-shaped articles (e.g., cylindrical, and/or symmetrical articles), the star wheel 20 is particularly suited to transport and control articles having shapes that are challenging to transport by conventional means, including known types of adjustable star wheels. The star wheel 20 can, for example, be used to transport: bottles with non-flat or rounded bottoms that would be unstable on a horizontal surface; bottles with small bases that will easily tip; bottles with angled and/or off-center necks; asymmetrical bottles; bottles of non-constant cross-section, etc.

Figure 2:
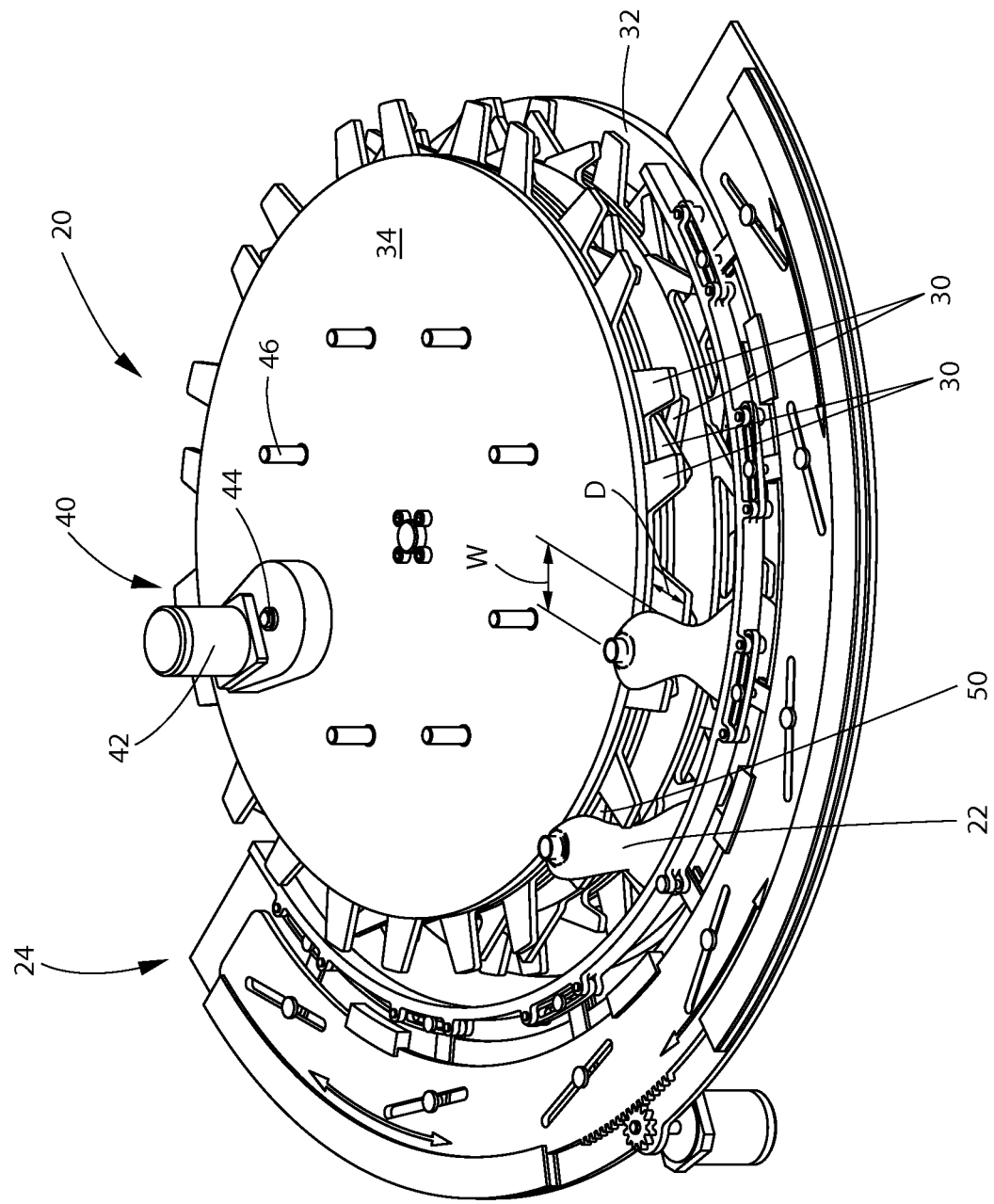
FIG. 2 is a perspective view of the adjustable star wheel in FIG. 1 with the several of the motors removed to show the underlying structure.
Figure 3:
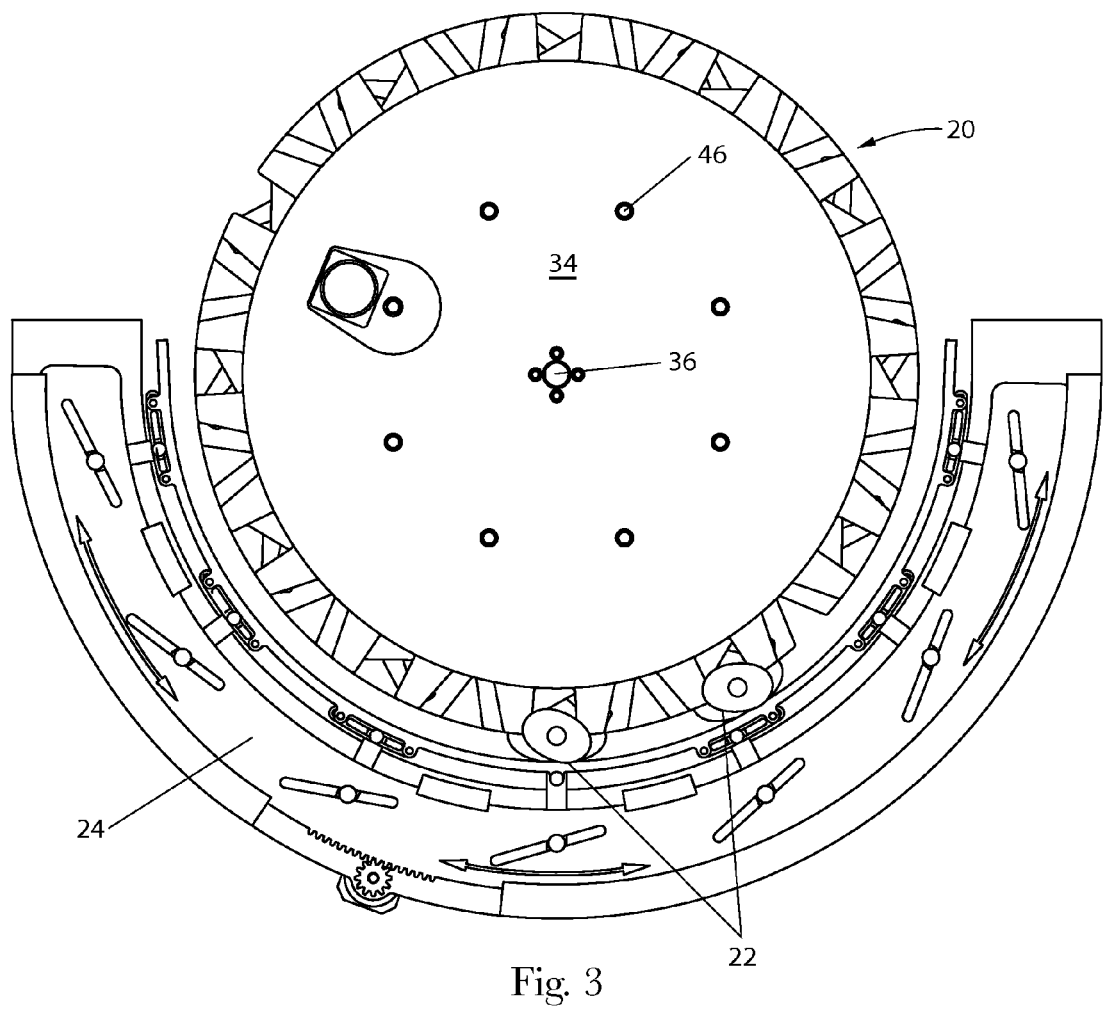
FIG. 3 is top plan view of the adjustable star wheel and guide rail in FIG. 2.
Figure 4:
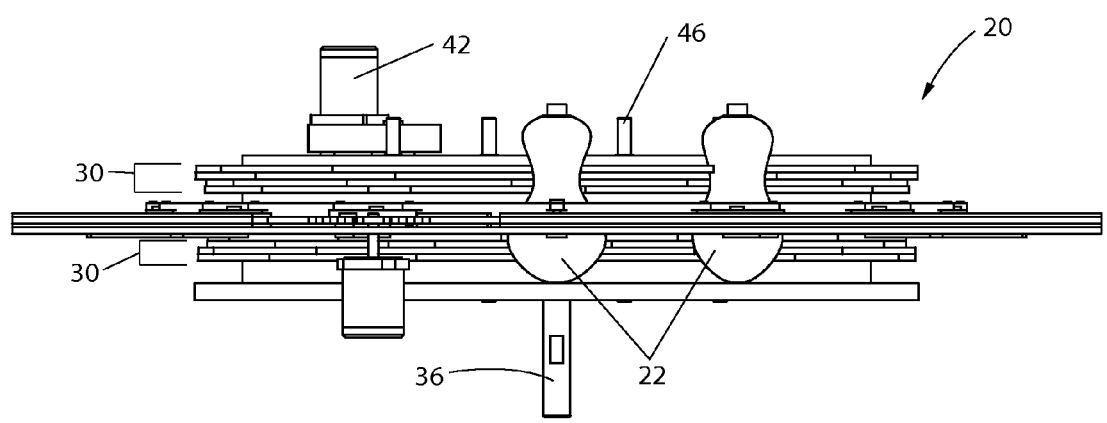
FIG. 4 is a side view of the adjustable star wheel and guide rail in FIG. 3.
Figure 5:
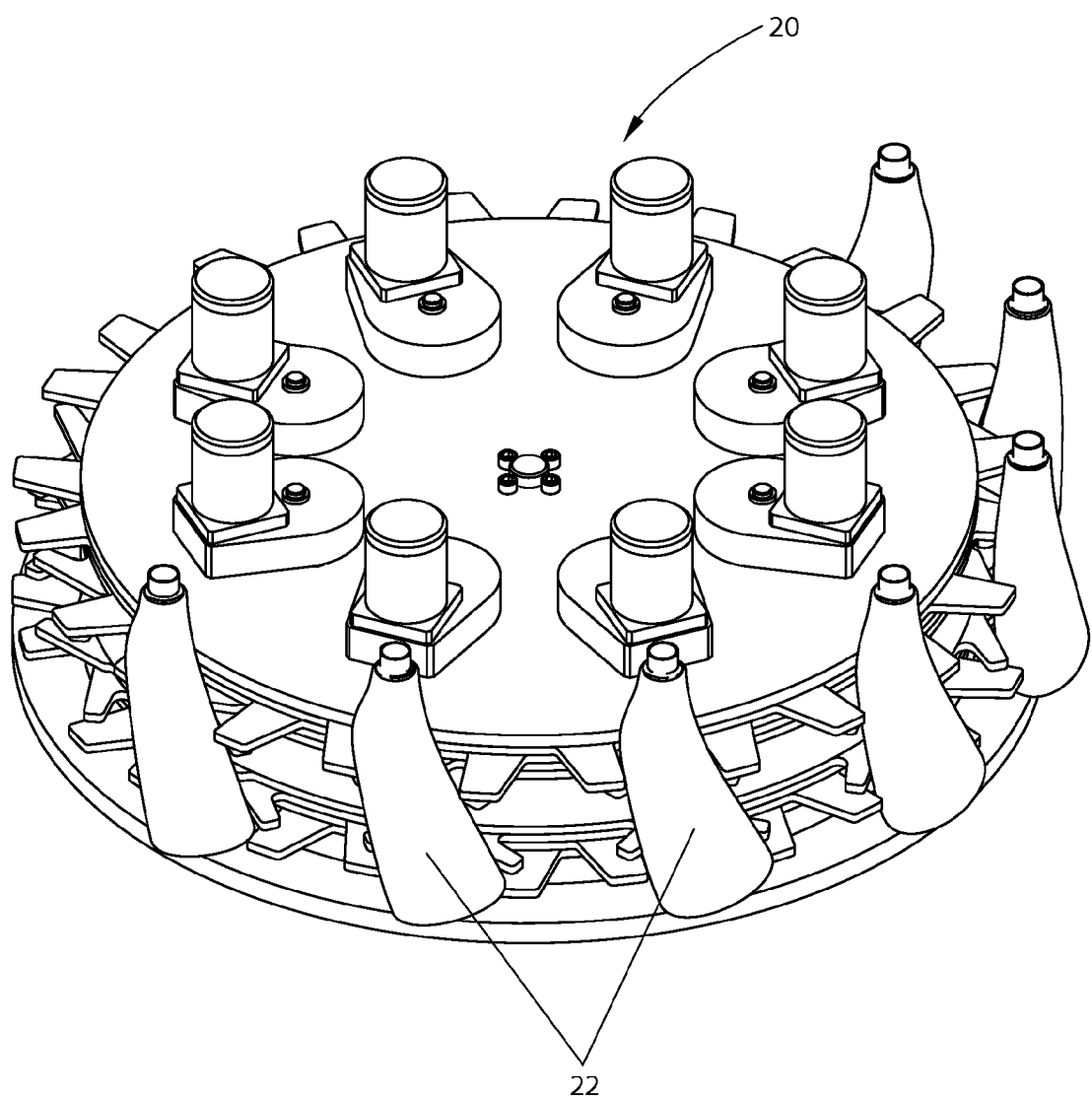
FIG. 5 is a perspective view of the adjustable star wheel transporting bottles with angled necks.

One such bottle is shown in FIGS. 2-4. The bottle 22 shown in FIGS. 2-4 is an example of a bottle having a rounded bottom that would be unstable on a horizontal surface. In addition, as shown from the top view in FIG. 3, the bottle 22 is also asymmetrical in that it has elliptical cross-sections that are twisted so that the cross-sections are not in alignment along the bottle's height. FIG. 5 shows an example of a bottle 22 with an angled neck. As shown in FIG. 5, this bottle 22 must be held at an angle with its bottom tilted relative to a horizontal surface in order to fill the same.

As shown in FIGS. 1 and 2, the star wheel conveyor 20 comprises a plurality of rotatable elements, which may be in the form of rotatable disks, designated generally by reference number 30. Although the term "disks" may be used in this description to describe several embodiments, it should be understood that whenever the term "disk" is used, it may be replaced with the term "rotatable element". The rotatable elements 30 are stacked and may be said to be concentric in that they have a common center although the center of each rotatable element 30 typically lies in a different plane.

The star wheel conveyor 20 may further optionally comprise a base plate 32, an intermediate plate 33 (shown in FIG. 6), and a top plate 34. The base plate 32, intermediate plate 33, and top plate 34 can be of any suitable size and shape. The base plate 32 can be stationary, or it can rotate. In the embodiment shown in the drawings, the base plate 32, intermediate plate 33, and the top plate 34 are circular. In the embodiment shown, the base plate 32 has a diameter approximately the same size, or slightly greater than that of the outermost portion of the periphery 54 of the disks 30. The periphery and other portions of the disks 30 are shown in detail in FIGS. 7A to 7H. The intermediate plate 33 and top plate 34 have a diameter approximately the same size as the portions of the disks 30 without the projections 58. In this embodiment, the base plate 32, intermediate plate 33, and the top plate 34 all rotate with the star wheel assembly when the pocket size is fixed. However, it should be understood that the rotating the base plate 32 is optional, and in other embodiments, the rotatable base plate 32 could be replaced by a flat stationary plate that may, for example, be larger than the remaining portions of the star wheel, and the articles 22 may slide on such a stationary base plate. Providing a rotating base plate 32 may, however, eliminate this sliding and any accompanying scuffing of the bottom of the articles 22.

The rotatable elements 30 and the plates (base plate 32, intermediate plate 33, and top plate 34) can be made of any suitable materials, or combinations of materials. Suitable materials include, but are not limited to metals and plastics, such as: stainless steel; aluminum (e.g., anodized aluminum): acetal resin (such as DuPont's DELRIN® acetal resin); and, polycarbonate. The rotatable elements 30 and the plates can be machined in the desired configuration, and then assembled together along with the other components of the star wheel conveyor 20 by any suitable known manufacturing methods.

As shown in FIG. 4, the star wheel conveyor 20 comprises a shaft 36 about which the rotatable elements 30 may at least partially rotate. At least one of the rotatable elements 30 may at least partially rotate in a clockwise direction, a counter-clockwise direction, or both directions. The fact that the rotatable elements 30 may rotate in both directions allows the rotatable elements to rotate at least slightly to bring the contact or control surfaces 60 in contact with, or in close proximity to, the article being conveyed. The rotatable elements 30 may, but need not, be able to rotate 360 degrees in both clockwise and counterclockwise directions. The rotatable elements 30 may, for example, rotate less than 360 degrees in the clockwise direction to bring the control surfaces 60 in contact with the article being conveyed. It should be understood that even though the term "contact" is used in many places in this specification, often one or more of the disks 30 may not actually contact the article 22. The term "contact", as used with reference to the articles 22, may be replaced throughout this patent application with the phrase "brought into proximity with" the articles 22. The rotatable elements 30 may then rotate counterclockwise once the position of the article has been fixed in the star wheel conveyor, in order to convey the article. Alternatively, the rotatable elements 30 may rotate less than 360 degrees in the counterclockwise direction to bring the control surfaces 60 in contact with the article being conveyed. The rotatable elements may then rotate clockwise once the position of the article has been fixed in the star wheel conveyor, in order to convey the article.

Figure 6:
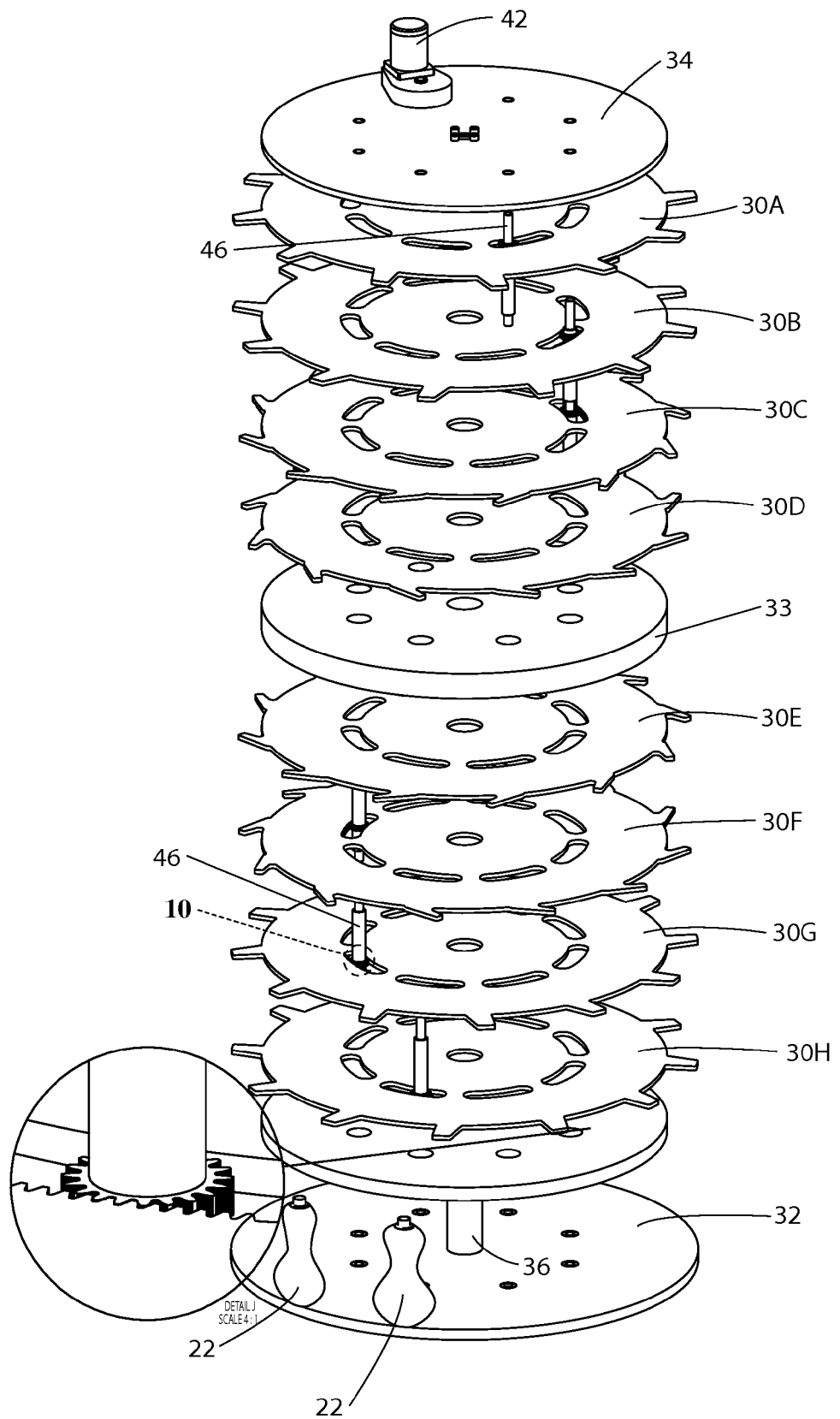
FIG. 6 is an exploded perspective view showing the components of the star wheel shown in FIG. 1.
Figure 10:
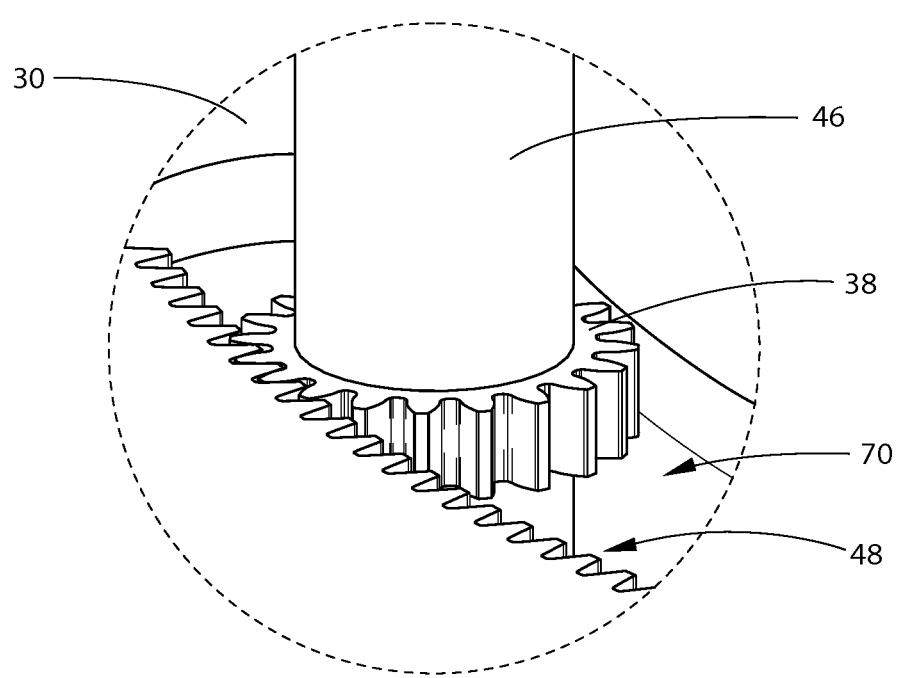
FIG. 10 is an enlarged perspective view of the pinion and gear arrangement for one of the disks shown in FIG. 6.
Figure 11:
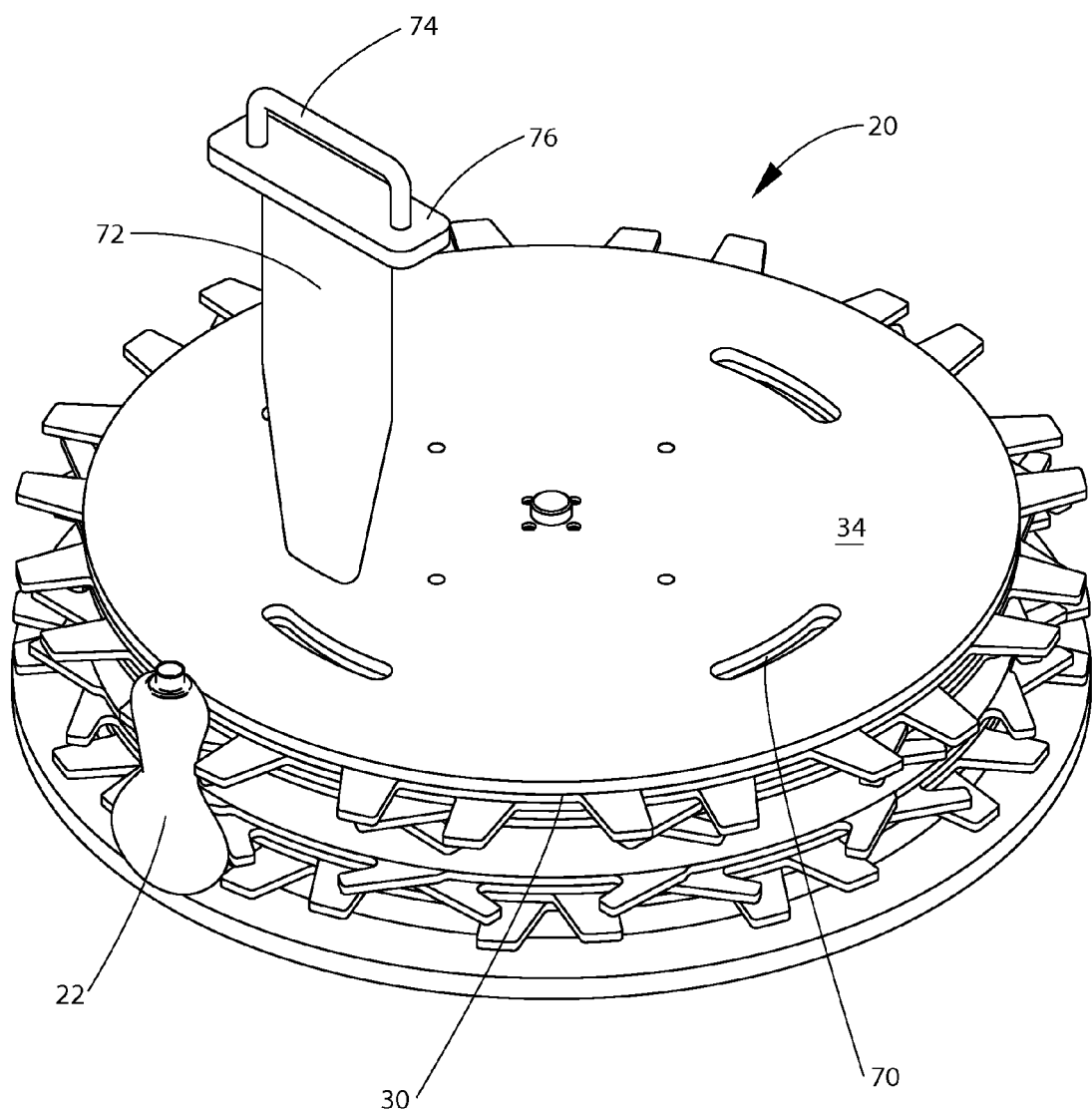
FIG. 11 is a perspective view of a star wheel conveyor having an alternative type of adjustment mechanism in the form of a tapered pin for inserting into slots in the disks.

In this embodiment, the star wheel conveyor 20 comprises an adjustment mechanism 40. Numerous different types of adjustment mechanisms are possible. In the embodiment shown in FIGS. 1-6, the adjustment mechanism 40 comprises at least one motor 42 that is operably connected to at least one alignment mechanism 44 for aligning (or adjusting the rotational position of) the rotatable disks 30. The alignment mechanism 44 in this embodiment comprises pinion gears 38 that are located on the motors' drive shafts 46, and the pinion gears (or "pinions") 38 mesh with gears 48 on the rotatable disks 30. The cooperation between the pinions 38 and the gears 48 on the disks 30 is shown in FIGS. 6 and 10.

The star wheel 20 may comprise any suitable number of rotatable elements or disks 30. In certain embodiments, it may be desirable for the star wheel 20 to comprise at least four, five, six, seven, eight, or more disks. In this particular embodiment, as shown in FIG. 6, the star wheel conveyor 20 comprises eight rotatable disks 30. The disks 30 are more specifically designated as first disk 30A, second disk 30B, third disk 30C, fourth disk 30D, fifth disk 30E, sixth disk 30F, seventh disk 30G, and eighth disk 30H. The star wheel 20 is rotatable around a central axis provided by a shaft or hub 36. The hub 36 can have a small diameter as shown in FIG. 4 or can be large in diameter, nearly filling the area of the disks up to the recess 56. This would result in disks 30 that resemble rings. The hub 36 can also be stepped in diameter and the mating center holes 52 in the disks 30 can have various corresponding diameters. Each of the disks 30 is configured to at least partially rotate in the same or opposite directions around the shaft 36. The disks 30 cooperate to form at least one pocket 50 within which the articles 22 being conveyed are held. There can be any suitable number of pockets 50 formed by the disks 30. Suitable numbers of pockets 50 can range from one or more, up to sixty, or more, pockets, depending on the size of the disks 30 and the size of the articles 22 being conveyed. A typical range of the number of pockets 50 may be from about 4-15 pockets. In the embodiment shown in the drawings, there are 12 pockets 50.

The disks 30 may have any suitable configuration. The configuration of these particular disks 30 is shown in greater detail in FIGS. 6 and 7A-7H. Each disk 30 has a central axis or center 52 and a periphery 54. The center 52 of the disks 30 has an opening for the shaft 36. The disks 30 may have at least one recess 56 in their periphery 54. Alternatively, or additionally, the disks 30 may have an element or projection 58 joined to the periphery 54 and extending outwardly therefrom to form the "point" of the star configuration. (It should be understood that the disks 30 need not have a configuration that resembles a star, and the projection that forms the star configuration need not terminate in a point, but may terminate in rounded, flat, or other configurations.) The portion of the disks 30 that form the recess 56, and/or the element 58 extending outwardly from the periphery 54 forms at least one control or contact surface 60 for assisting in controlling at least the location, and if needed, the orientation of the three dimensional article 22 being conveyed. The element 58 may also have a side 62 opposite the control surface 60. The configuration of side 62 of the element 58 is less important than that of the control surface 60.

The term "joined to", as used in this specification, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined to" encompasses configurations in which an element is secured to another element at selected locations, as well as configurations in which an element is completely secured to another element across the entire surface of one of the elements.

The control surface 60 is joined to or near the periphery 54 of the disk 30. The control surfaces 60 on the disks 30 together form at least one pocket 50 for the three dimensional articles 22. The pocket 50 has a width, W, and a depth, D. It should be understood, however, that the width W and depth D of the pocket 50 may vary at the different planes defined by the different disks 30 from the top to the bottom of the star wheel 20 to accommodate the configuration of the different portions of the cross-section of the articles 22 being conveyed.

Figure 9:
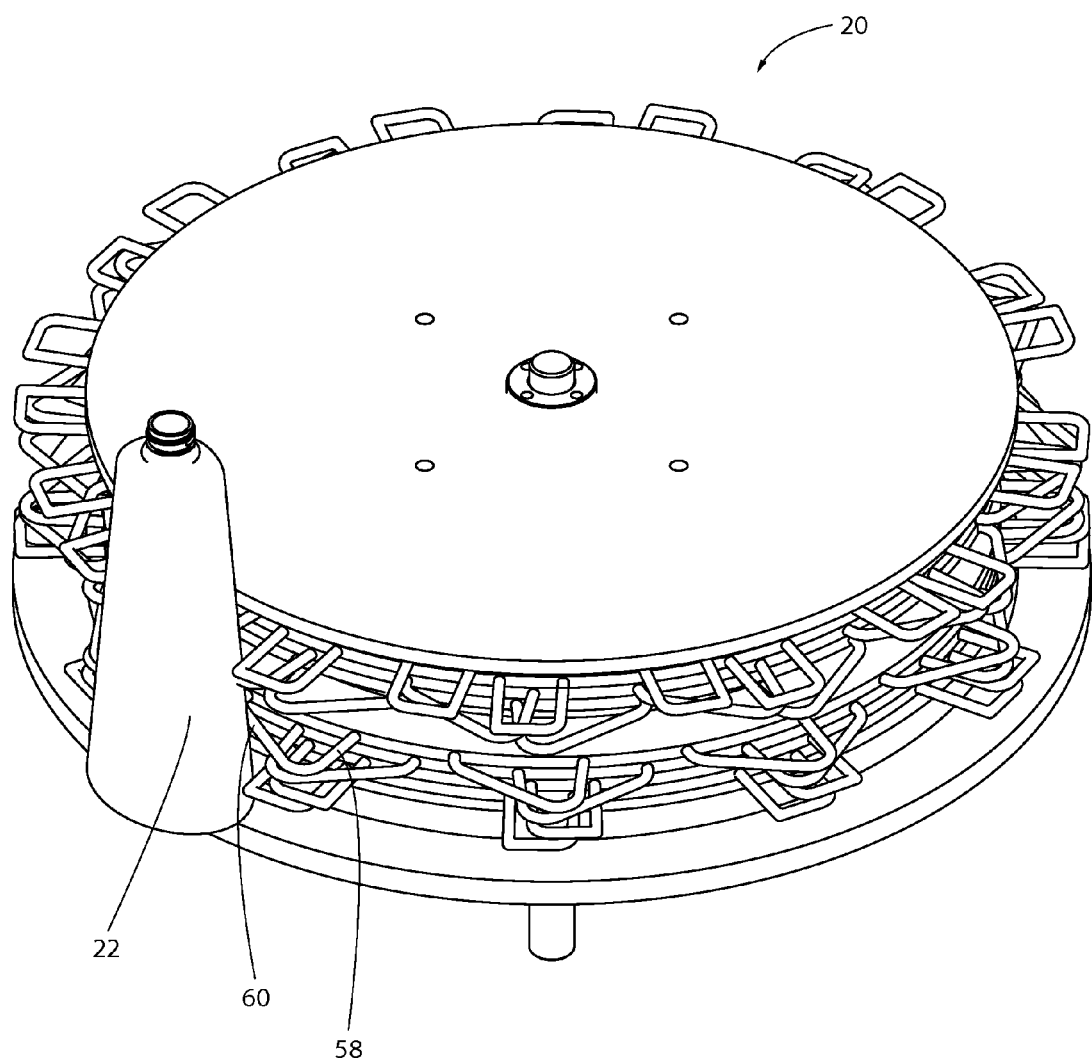
FIG. 9 is a perspective view of a star wheel having loops joined to disks to form the control surfaces.

The rotatable elements 30 are not limited to elements in the form of disks. The rotatable elements 30 can be in any suitable configuration that is capable of rotating and providing the desired control surfaces 60 to form pockets for the articles. For example, FIG. 9 shows a star wheel conveyor 20 having elements in the form of loops 58 joined to the disks 30 to form the control surfaces 60. It will be appreciated that the portions of the star wheel conveyor 20, such as the rotatable elements 30, may need to be cleaned particularly if the star wheel conveyor 20 is used to convey bottles to a liquid filling machine. Star wheel conveyors having rotatable elements in such other configurations may be cleaned more easily. The rotatable elements 30 may also comprise of more than one piece so that the rotatable elements can be split for assembly around fixed equipment or to reduce the size for fabrication and assembly.

The various rotatable elements (e.g., disks) 30 in the stack of rotatable elements will typically have at least two different configurations. In various embodiments, there can be any suitable number of different disk 30 configurations ranging from two, three, four, five, six, or more, different disk configurations up to a different disk configuration equal to the total number of disks 30. Fewer numbers of different configurations may, however, be better from a cost standpoint due to the cost of designing and manufacturing the disks 30. The different disks 30 can have any suitable configurations.

FIG. 6 and FIGS. 7A-7H show one example of the different disk 30 configurations that may be used in the adjustable star wheel conveyor 20. FIGS. 7A to 7H show that in this particular embodiment where eight disks are used, there are basically two different disk configurations. The two basic configurations are that of disk 30A shown in FIG. 7A and disk 30C shown in FIG. 7C. The disks shown in FIGS. 7A, 7B, 7G, and 7H all have the same configuration, a first configuration. The disks shown in FIGS. 7C, 7D, 7E, and 7F all have the same configuration, a second configuration. These particular disks 30 may be thought of as resembling circular saw blades with gaps (where there are no teeth) between their "teeth-like" projections 58. The disks 30 of the adjustable star wheel 20, of course, need not be sharp edged. The arrow in the center of the disk 30A shows the direction of star wheel 20 rotation as being clockwise in this particular embodiment. Thus, this particular star wheel 20 (when the configuration of the pockets 50 is set and the disks 30 are locked in place) will be rotating clockwise in order to transport the bottles 22. It should be understood that in other embodiments, the star wheel 20 may also, or alternatively, be capable of rotating in the counterclockwise direction. The overall rotation of the star wheel 20 should not be confused with the rotation of the individual disks 30. It should, thus, be understood, that the disks 30 are capable of at least partially rotating in both the clockwise and counterclockwise directions in order to set the configuration of the pockets 50 to fit the article 22 being conveyed.

The disks 30 with the different configurations can be stacked from top to bottom in any suitable order and orientation. Two or more of the disks 30 with the same configuration may be adjacent to each other in the stack of disks 30. Alternatively, the disks with the same configuration may be arranged so that they are not adjacent and there is at least one disk of a different configuration therebetween. The disks 30 with the same configuration may have the same side of the disk facing upward. Alternatively, depending on the configuration of the disks, one or more of the disks 30 may be flipped so that a different side of the disk 30 faces upward. The various disks 30 can be stacked (e.g., vertically) so that they form one or more sets of stacked disks 30. For instance, the disks 30 in the set may be grouped together as a set of disks such as by being spaced more closely to each other than they are relative to other disks in the stack. Of course, there may be at least some space or clearance between adjacent disks 30 so that the disks 30 will be able to rotate, and to allow the star wheel 20 to be cleaned in the spaces between the disks 30.

Figure 7A:
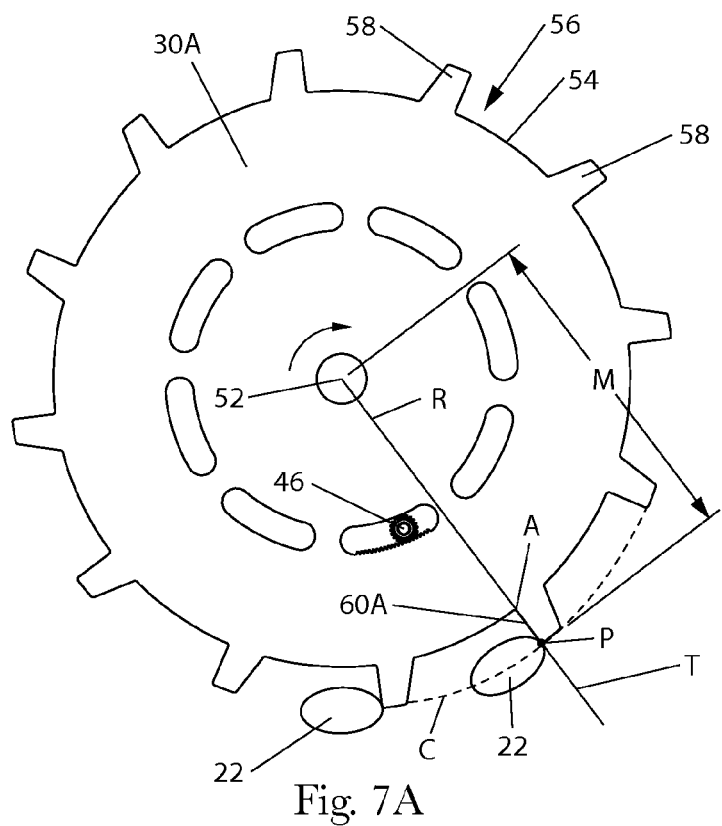
FIG. 7A is a top view of the first disk of the embodiment shown in FIG. 1.
Figure 7B:
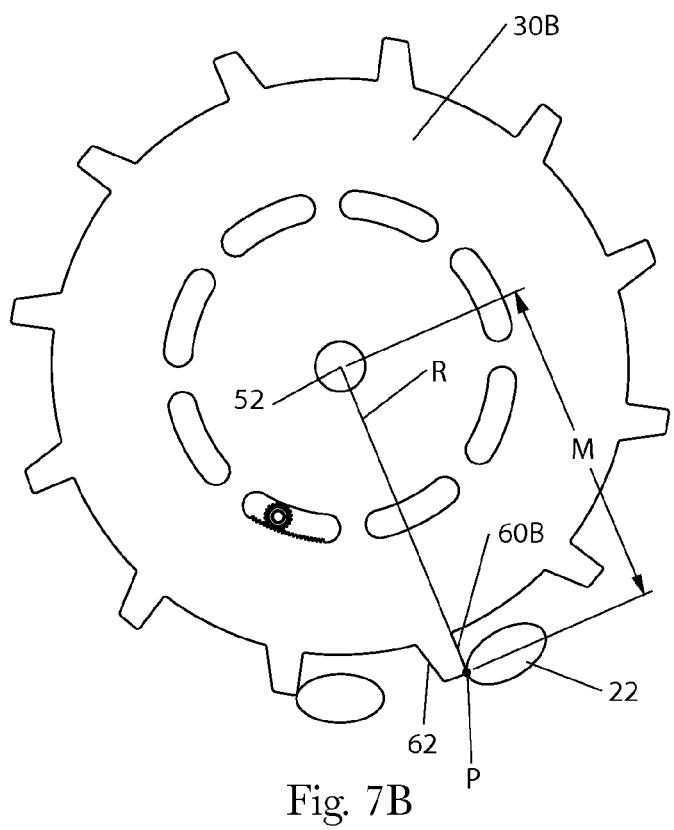
FIG. 7B is a top view of the second disk of the embodiment shown in FIG. 1 showing similar elements to those shown in FIG. 7A for the second disk.
Figure 7C:
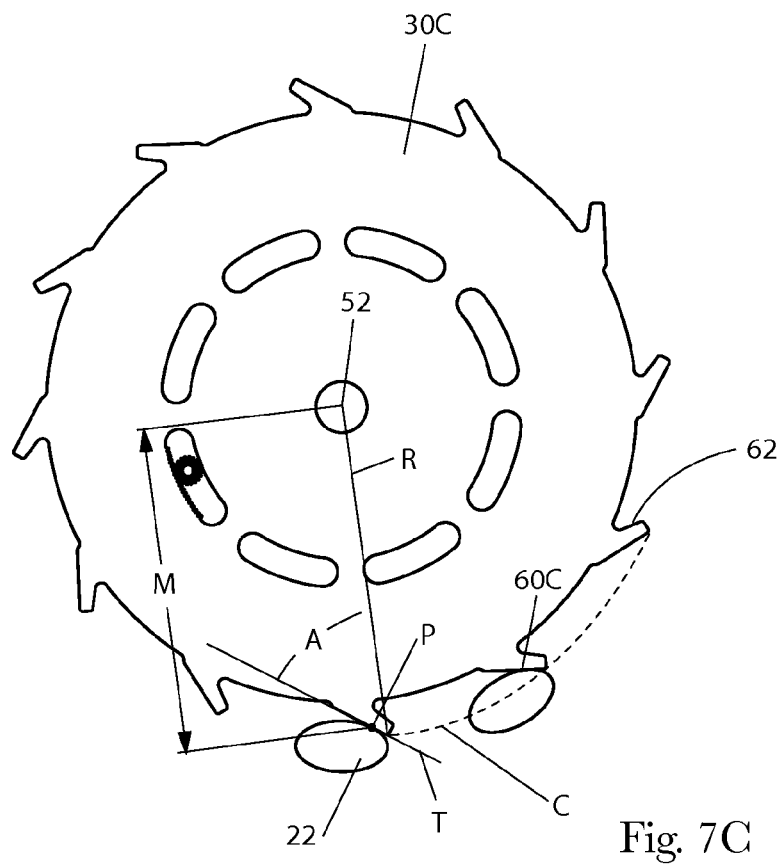
FIG. 7C is a top view of the third disk of the embodiment shown in FIG. 1 showing similar elements to those shown in FIG. 7A for the third disk.
Figure 7D:
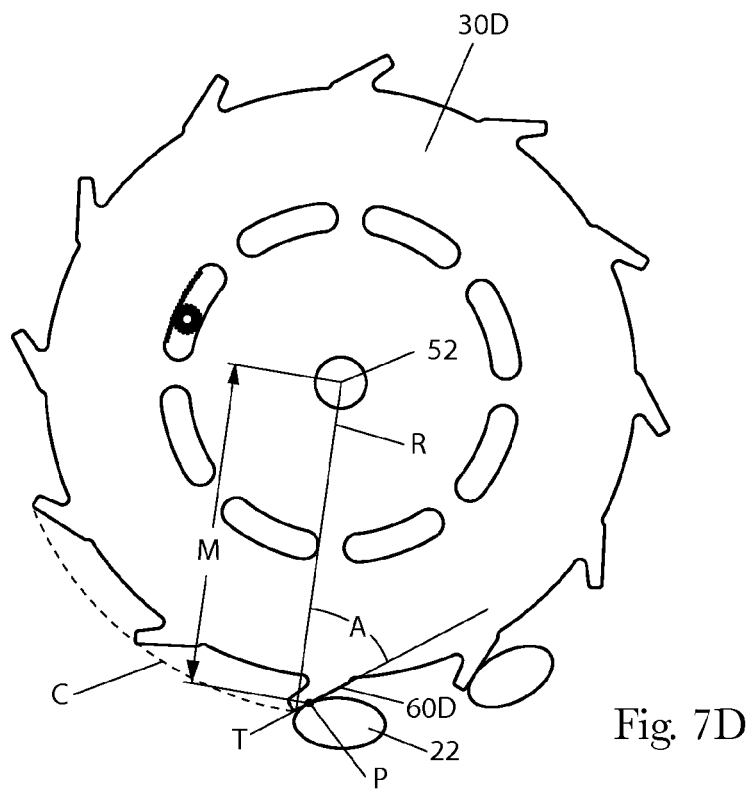
FIG. 7D is a top view of the fourth disk of the embodiment shown in FIG. 1 showing similar elements to those shown in FIG. 7A for the fourth disk.
Figure 7E:
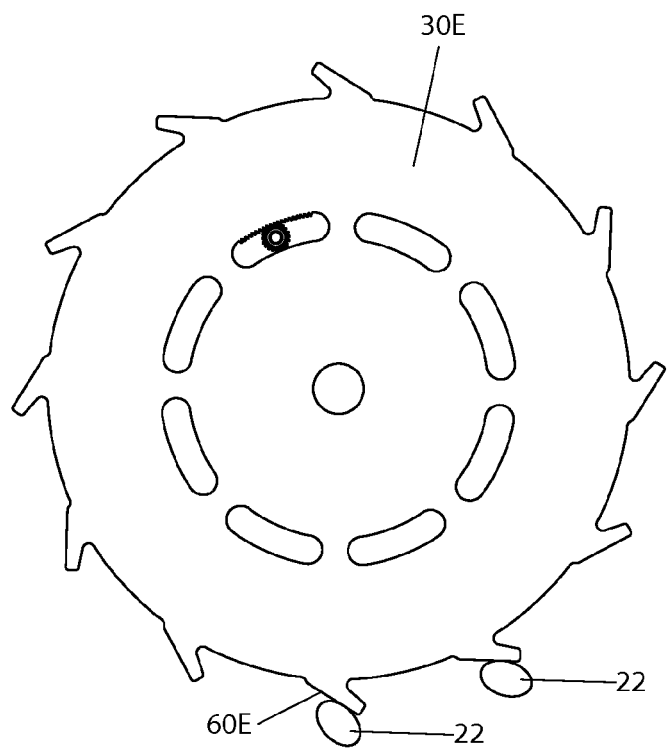
FIG. 7E is a top view of the fifth disk of the embodiment shown in FIG. 1 showing similar elements to those shown in FIG. 7A for the fifth disk.
Figure 7F:
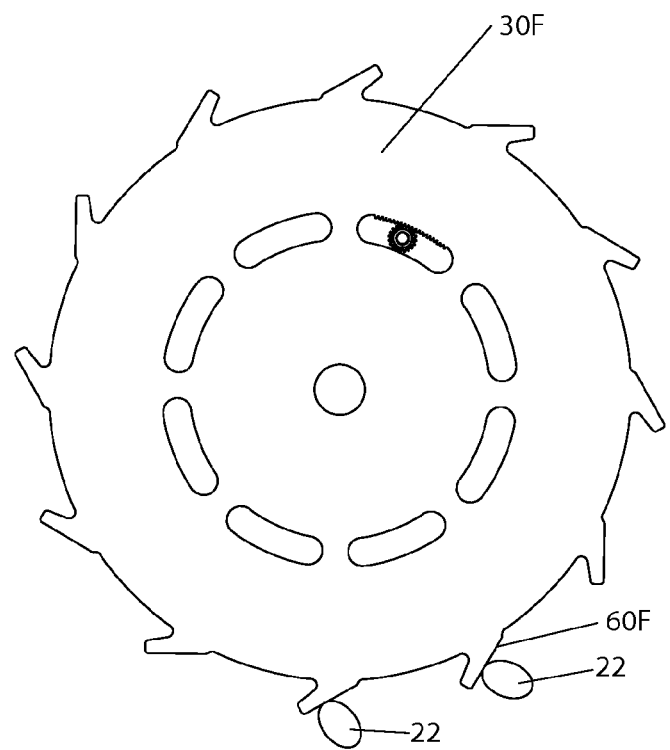
FIG. 7F is a top view of the sixth disk of the embodiment shown in FIG. 1 showing similar elements to those shown in FIG. 7A for the sixth disk.
Figure 7G:
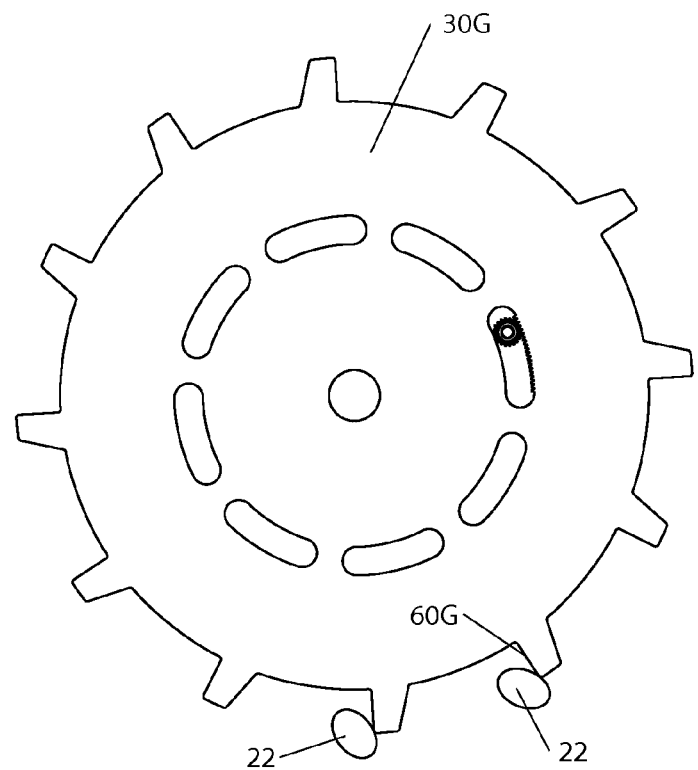
FIG. 7G is a top view of the seventh disk of the embodiment shown in FIG. 1 showing similar elements to those shown in FIG. 7A for the seventh disk.
Figure 7H:
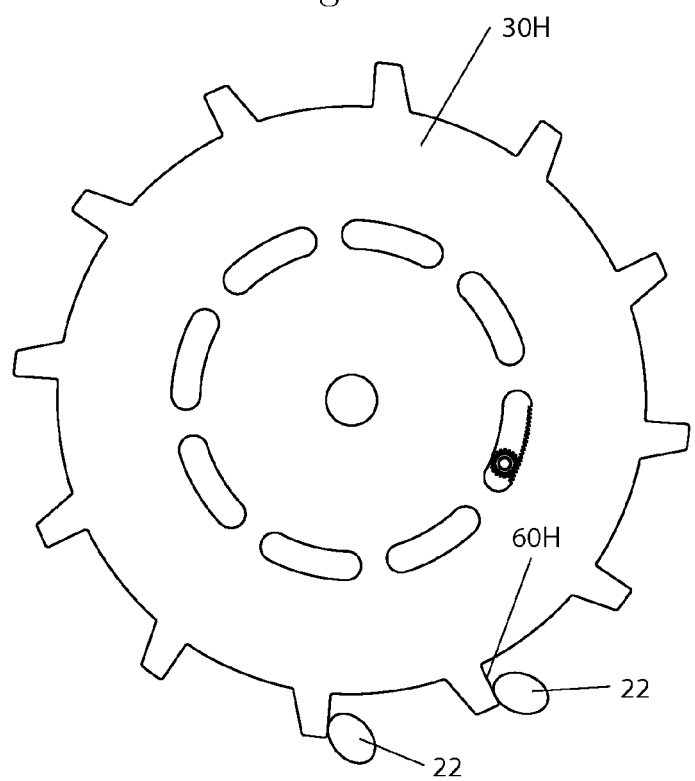
FIG. 7H is a top view of the eighth disk of the embodiment shown in FIG. 1 showing similar elements to those shown in FIG. 7A for the eighth disk.

In the embodiment shown, the disks 30A and 30G shown in FIGS. 7A and 7G, respectively, have a first configuration. In addition, both of these disks are oriented so that the same side of the disks faces upward, and their respective control surfaces 60A and 60G contact the trailing portion of the bottle 22. Disks 30B and 30H also have the first configuration, but they are flipped so that a different side of the disks faces upward in the star wheel conveyor 20. The same side of the projections 58 forms the control surfaces 60B and 60H, respectively, on disks 30B and 30H, but in this case, control surfaces 60B and 60H contact the leading portion of the bottle 22. Disks 30C and 30E shown in FIGS. 7C and 7E, respectively, have a second configuration. Disks 30C and 30E are oriented so that one side their projections 58 form control surfaces 60C and 60E that contact the trailing portion of the bottle 22. Disks 30D and 30F also have the second configuration, but they are flipped so that a different side of the disks faces upward in the star wheel conveyor 20. The same side of projections 58 of disks 30D and 30F form control surfaces 60D and 60F, but in the case of disks 30D and 30F, they contact the leading portion of the bottle 22.

The disks 30 may be arranged in any suitable order, and any combination of disks may be grouped to form a set of disks. As shown in FIGS. 6 and 8, in this particular embodiment, these eight disks 30 are arranged in two vertically stacked sets of four disks, with disks 30A to 30D forming an upper set of disks and disks 30E to 30H forming a lower set of disks. In the embodiment shown, the disks 30 are arranged to have the control surfaces 60 that describe the width W of the bottle pocket (30A, 30B, 30G, and 30H) at the highest and lowest points of the stack of disks to maximize control of the bottle 22 against tipping. The two sets of disks, thus, form pockets 50 that fully support the article 22 being conveyed at two general elevations. The control surfaces 60 that describe the depth D of the bottle pocket (30C, 30D, 30E, and 30F) are placed in the middle.

FIGS. 7A to 7H show the control surfaces 60 of the rotatable disks 30 in greater detail. The control surfaces 60 may be in any suitable configuration. The control surfaces 60 may have a plan view configuration when looking at the disk 30 from above that has a rectilinear (straight line) configuration, a curvilinear configuration, or combinations of rectilinear and curvilinear segments. If the control surfaces are comprised of curvilinear segments, they may be concave or convex with respect to the article 22 being conveyed. The configuration of each of control surfaces 60 on a given rotatable element 30 may be the same, or different.

As shown in FIGS. 7A to 7H, the disks 30A-30H comprise control surfaces 60A-60H that comprise at least a portion that may be described relative to an angle A the control surfaces 60 make with a radial line, R, extending from the center 52 of the disks 30. As shown in the drawings, there is tangent line T that passes through the tangent point (or "contact point") P where the control surface 60 contacts the article, bottle 22. In cases where the control surface 60 does not actually contact the article 22, then "contact point" P will be the nearest point on the control surface 60 to the article 22. The radial line R is drawn through the intersection of the tangent line T and a circle, C, that is drawn through the outer diameter of the disk (e.g., a circle that passes through the tips of the star). As shown in FIGS. 7C and 7D, the angle A may be measured by turning in either direction relative to the radial line R, provided that angle A is turned in the direction of the largest portion of the cross-section of the article 22. Angle A can be any suitable angle from greater than or equal to about 0 degrees relative to the radial line R, up to less than about 90 degrees. A typical value for angle A is from about 30 to about 75 degrees. A larger angle better defines the depth of the pocket and a smaller angle reduces the amount of rotation of the disk required to adjust pocket depth. It will be appreciated that in certain cases, such as if the control surface 60 is concave, or otherwise configured to more closely fit the shape of the cross-section of the article 22 being conveyed, that the control surface 60 may contact the article at multiple points. In such a case, if the relationship described in any of the appended claims is present with respect to any of such multiple contact points P, then it will be considered to fall within the scope of such a claim.

As shown in FIG. 7A, in this embodiment, the first disk 30A comprises a first control surface 60A that either generally follows radial line R, or forms an angle of slightly greater than about 0 degrees relative to the radial line, R to provide some draft for easy bottle release. It is possible for this angle to vary substantially from the radial line as long as the resulting angle A is less than the angles A shown in 7C and 7D. The first control surface 60A is positioned to be disposed adjacent the downstream side of a three dimensional article 22 when it is in a pocket. The terms "upstream" and "downstream" sides of the article 22 are dependent on the direction of rotation. In this case, the star wheel rotates clockwise. The upstream side of the article 22 is the leading portion of the article in the direction of travel. The downstream side is the trailing portion of the article as it moves in the direction of travel.

At least one other disk or a second disk, comprises a second control surface 60 that comprises at least a portion that is generally disposed at an angle with a radial line R extending from the center 52 of the second disk. The second control surface is positioned to be disposed adjacent the upstream side of a three dimensional article 22 when it is in a pocket. In the embodiment shown in FIGS. 7A-7H, the at least one other disk is the third disk 30C shown in FIG. 7C. As shown therein, the angle A of the control surface 60C on at least one disk 30C other than the first disk 30A is different from the angle A of the first control surface of the first disk 30A. More particularly, the angle A of the control surface 60 C is greater than the angle A of the control surface 60A of disk 30A such that line T will contact the bottle in a different region of the bottle than line R. This allows the control surface 60 C to at least partially form the depth D of at least a portion of the pocket. It should be understood that in the embodiment shown, there are other disks 30 that could be considered to comprise the at least one other, or second disk.

Another way of describing the relationship between the different contact points P on the control surfaces 60 is to measure how far the contact points P are from the center 52 of the disks 30. This distance between the center 52 of the disks 30 and the contact points P is taken along the radial line R will be referred to as measurement, M. Thus, the distance M between the center 52 of the disk and the contact point P on at least one disk 30C is less than the distance M between the center 52 of the disk 30A and contact point P of a first disk 30A. This allows the control surface 60 C to at least partially form the depth D of at least a portion of the pocket.

The disks 30 on the star wheel 20 may combine to form any suitable number of contact points P with the article 22 being conveyed. Suitable numbers of contact points include, but are not limited to 4, 5, 6, 7, 8, or more contact points P. In the embodiment shown in FIGS. 7A-7H, each of the disks 30 may form at least one contact point P with the article 22. There are, thus, eight contact points for securing the article 22 in a given pocket 50. Since the disks 30 are arranged in two sets of four disks each, there are four contact points P for the article 22 to support the article at two different levels. For more simple and stable bottle shapes, contact points at a single elevation with four disks may provide adequate control. In any of these embodiments, the star wheel 20 may be provided with a mechanism for adjusting the relative height of one or more of the disks 30 (that is, for adjusting the distance between the plane of the disk 30 and the base plate 32 (or other surface upon which the articles are placed)). Such a feature may be of especially of interest for the upper disks 30. This will provide the star wheel 20 with even more flexibility to handle articles 22 of various different sizes and shapes.

FIGS. 8 to 8D show how the pairs of the disks 30 combine to form the different portions of a pocket 50. FIG. 8A shows how the projections 58 on the bottom pair of disks 30G and 30H combine to form a portion of a pocket 50 for bottle 22. FIG. 8B shows how the projections 58 on the next pair of disks 30E and 30F combine to form another portion of a pocket 50 for bottle 22. FIG. 8C shows how the projections 58 on the next pair of disks 30C and 30D combine to form another portion of a pocket 50 for bottle 22. FIG. 8D shows how the projections 58 on the top pair of disks 30A and 30B combine to form the final portion of the pocket 50 for bottle 22.

The adjustable star wheel 20 can be adjusted in any suitable manner to accommodate articles, such as bottles 22, with different shapes. In the embodiment shown, the width W of the star wheel pocket 50 can be adjusted by rotating disks 30A, 30B, 30G, and 30H. To accommodate a wider article, such as bottle 22, disks 30A and 30B are rotated in opposite directions so that the contact points P move away from each other. The depth D of the star wheel pocket 50 is adjusted by rotating disks 30C, 30D, 30E, and 30F. To accommodate a deeper bottle, disks 30C, 30D, 30E, and 30F are rotated so that the angled portions of the disks move away from each other to create a deeper pocket. Often, the cross sectional shape of a bottle will change with elevation. For instance, the bottle 22 might have a wider base and smaller top. In this case, the upper and lower sets of disks can be adjusted independently to create a large pocket for the bottom and a smaller pocket for the top. Bottles can also be asymmetric about the vertical central plane. In this case, the disks 30C, 30D, 30E, and 30F with larger angled contact surfaces can be adjusted to varying depths to create an asymmetric pocket 50. In this embodiment, adjusting the relative rotation of all eight disks 30 creates a fully amorphous star wheel pocket 50 that will adjust to virtually any article shape and fully supports the article 22 at two elevations.

As shown and described herein, the boundaries of the pockets 50 may be configured solely by at least partially rotating at least some of said disks 30 to adjust the angular displacement or location of the control surfaces 60 on the different disks. The control surfaces form a pocket 50 that is configured to generally follow the contour of the three dimensional article being conveyed. The position of the disks 30 is then fixed before rotating the star wheel conveyor 20 to transport the articles 22. All of the adjustments to set the width W and depth D of the pockets 50 are made by rotational movement around the central axis, shaft 36. The star wheel conveyor 20 may, therefore, be free of elements that are axially movable inwardly and outwardly (that is, inwardly and outwardly movable in the general direction of the radial line R) to form the boundaries of the pocket. The star wheel conveyor 20 may also be free of grippers or elements that have a pivoting axis that pivot about a point that is at a location other than the axis of rotation of the star wheel or that of the rotatable elements 30. The adjustable star wheel conveyor 20, thus, has relatively few moving parts, and the adjustment of the width and depth of the pockets can be controlled by a single mechanism.

The mechanism 40 for adjusting the configuration of the pockets 50 can be manually adjustable or automatically adjustable. FIGS. 1-8 and 10 show one non-limiting embodiment of an automatic mechanism 40 for adjusting the configuration of the pockets 50. The mechanism 40 comprises at least one motor 42 having a drive shaft 46 that drives at least one pinion (or "first gear") 38 to turn one or more of the disks 30. More specifically, in this embodiment, there are eight small gear motors 42 that through the drive shafts 46 drive eight pinions 38 that are each geared to one of the eight disks 30. Any suitable type of motor can be used. Suitable types of motors include, but are not limited to: gear motors, servo motors, stepper motors, DC motors, hydraulic motors, and air motors. The term "gear motors", as used herein, refers to motors having a gear box. The motors 42 may be in any suitable location. In the embodiment shown, the motors are on top of top plate 34. The motors are each operatively connected to one of the drive shafts 46.

The pinion gears 38 can mate with gears (or "second gears") 48 located on the disks 30. The gears 48 may be in any suitable location on or within the disks 30. As shown in FIGS. 6 and 7A-7H, in this embodiment, each of the disks 30 has one or more arcuate holes 70 cut into the same. The disks 30 can be provided with any suitable number of arcuate holes 70. In this particular embodiment, each of the disks 30 has eight arcuate holes 70 therein. The arcuate holes 70 are arranged intermittently in the configuration of a circle that is located between the center 52 and the periphery 54 of the disks 30. In the embodiment shown, the gears 48 on the disks 30 are located at least partially within the arcuate holes 70. In other words, the gears 48 are affixed to the portion of the disks 30 that define the boundaries of the arcuate holes 70. The disks 30 may each have one or more sets of gears 48 thereon. However, in this embodiment, each disk 30 only has one set of gears 48 in one of the arcuate holes 70. The other arcuate holes 70 have no gears in their interior, and are provided simply to permit the drive shafts 46 and pinions for the other disks 30 to pass through the disks as shown in FIG. 6. The gears 48 on the disks 30 can be formed in any suitable manner. The gear teeth in the disks 30 can be formed by water jet cutting the disk material as shown in the drawings, or by installing hardened gear inserts in the disks 30.

In the embodiment shown in the drawings, the positions of each of the disks 30 is adjusted when the associated motor 42 rotates its shaft and turns its pinion 38, which in turn is engaged with the gears 48 on the disk 30 and rotates the disk 30 so that its contact surface 60 is in the desired position. The illustrated embodiment shows one motor 42 positioning each disk 30. In alternative embodiments, one motor 42 can be configured to position two or more disks 30. This can be accomplished by axially shifting the pinion 38 (that is, moving the pinion 38 in a direction parallel to the hub 36) between the gears 48 of multiple disks 30.

The motors 42 are typically powered by electric current. Wires may provide current from a source of electric current to the motor to power the motors 42. In one embodiment, the motor position is controlled by a controller. The system for controlling the motors 42 can be in the form of a closed loop control system that provides feedback to the controller of the true motor position with a measurement device such as an encoder or resolver. However, in other embodiments, the desired position can be commanded to an open loop device such as a stepper motor without position feedback. Additional wires can be used to transmit the feedback of motor and/or disk position to the controller. The computer and/or controller can be located remotely from the star wheel 20 and can communicate electrically via slip rings or other means of commutation that allow relative rotation motion between the star wheel 20 and the controller. Alternatively, the star wheel 20 can be rotated and stopped at a position that enables it to be contacted by electrical contacts. Communication is also possible between a computer and a controller or motor drive rotating with the star wheel 20 by wireless means using radio frequency, light, or sound. Power can be supplied to the drive motors by batteries rotating with the star wheel or can be transmitted from the base machine by commutation or induction.

Alternatively, to provide a manually adjustable mechanism, the motors 42 may be replaced with a manual hand crank, a manually adjusted gearbox with a counter, a manually adjusted counter, etc.

In addition to the pinion gear adjustment mechanism described above, a number of other adjustment mechanisms exist for either automatic or manual adjustment. One low cost manual adjustment option is shown in FIGS. 11-14. In this embodiment, holes 70 are provided in the top plate 34 and all the disks 30. The holes 70 can be in any suitable configuration. Portions of the disks 30 define the boundaries of the holes 70. In the embodiment shown, the holes are in the form of arcuate slots 70. An identical slot 70 is cut into each disk 30; however the relative angle between each slot and projection 58 will vary for each disk to create the desired pocket 50 when all of the slots 70 are vertically aligned. The arcuate slots 70 are concentric with the axis of rotation, and can be vertically aligned to create a specific size pocket 50. In other embodiments, the holes 70 need not be arcuate or concentric.

In other embodiments, the slots 70 in the disks 30 can, for example, have a dog bone or a FIG. 8 shape.

A tapered element, such as spade-shaped tapered pin 72 can be pushed into the slots 70. This will exert a force on the portions of the disks that define the boundaries of the slots 70 and cause the disks 30 to rotate so that the slots 70 align. As shown in the drawings, the spade-shaped tapered pin 72 is wider at the top (or proximal end) and narrower at the distal end that is first inserted into the slots. The tapered pin 72 may be tapered from a wider to narrower width along at least part of that portion of its length that contacts the disks 30 when the tapered pin 72 is inserted into the slots 70. In the embodiment shown in the drawings, the tapered pin 72 is tapered along substantially its entire length. The tapered pin 72 has a handle 74 on top thereof, and a restraint 76 to which the tapered pin 72 and handle 74 are joined. The restraint 76 serves to limit the depth to which the tapered pin 72 can be inserted. Pushing the tapered pin 72 into one of the slots 70 will select the size and shape of a pocket 50 for one size and shape of article 22 to be conveyed. The different slots 70 on the uppermost disk 30A and the slots that lie vertically underneath on the underlying disks differ in that each will align to create a different shape and/or size pocket 50. Pushing the pin 72 through another slot 70 will at least partially rotate the disks 30 to adjust the pocket control surfaces to accommodate another bottle of another pre-selected shape and/or size. (Thus, one does not need to manually rotate and align holes in the disks before inserting the pin.) Either the tapered pin 72 or other mechanical clamps can be used to lock the shape of the pocket 50 in place before the star wheel 20 rotates to convey the articles 22. Disks 30 can be cut with multiple slots 70 to define multiple pre-determined article configurations. Many articles can be accommodated by distributing the slots 70 on the surfaces of the disks 30 and in multiple bands at different radii.

FIGS. 15-21 show another alternative embodiment for adjustment of the star wheel 20 for different size and/or shape articles 22. In this embodiment, the disks 30 each have several holes 80 formed therein. The disks 30 can have any suitable number, size and shape of holes 80 formed therein. In the embodiment shown, each disk 30 has four identical holes 80 formed therein. The holes 80 shown are spaced equally around the disks 30 and are located between the center 52 and the periphery 54 of the disks 30. The holes 80 in this embodiment are generally trapezoid-shaped. However, the base and top of the trapezoid shaped holes 80 are arcuate, and the sides of the trapezoid shape holes 80 are generally linear.

Figure 19:
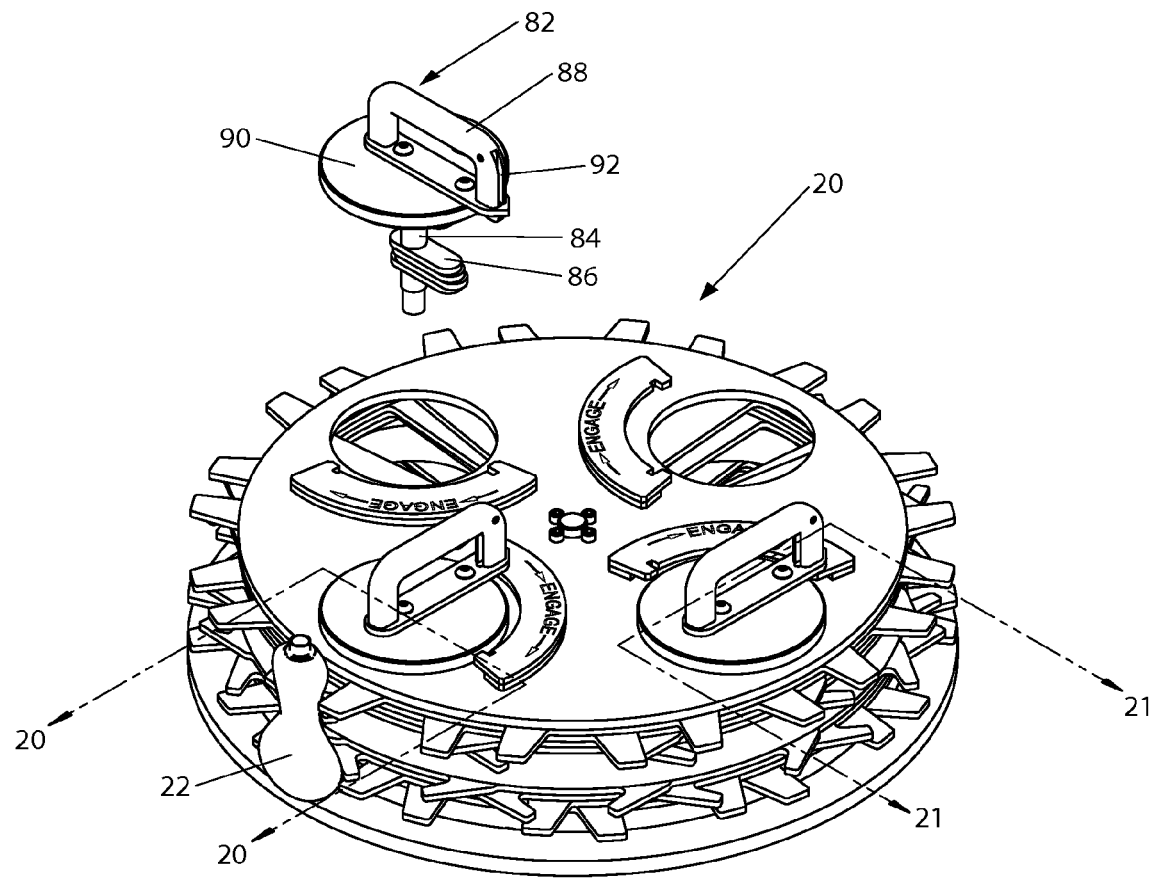
FIG. 19 is a perspective view of a star wheel conveyor shown in FIG. 15 with two of the keys removed. One of the keys is suspended above the star wheel assembly and is ready for insertion.

In this embodiment, changes to the size and/or shape of the pockets 50 are made using the manually adjusted quick change elements, which may be in the form of keys 82. As shown in FIG. 19, the key 82 and has a shaft 84 with one or more elements such as cams or lobes 86 projecting therefrom. In this particular embodiment, each key 82 has eight lobe-shaped cams 86, one for engaging each of the eight disks 30 and moving them to the desired angular position. The keys 82 may optionally each comprise a handle 88 and a restraint 90 joined to the shaft 84. The handle 88 provides a convenient way for the operator to apply torque to the key 82 and then to lock the key in the desired position. It is also designed to make it easy to pull a key 82 in and out. The handle 88 may also have an optional locking mechanism, such as a locking trigger 92 thereon.

Figures 20, 21:
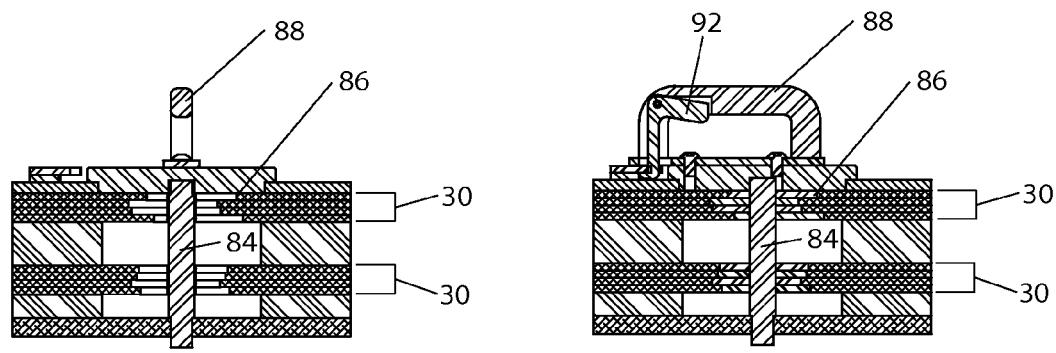
FIG. 20 is a cross-sectional view taken along lines 20-20 of FIG. 19.
FIG. 21 is a cross-sectional view taken along lines 21-21 of FIG. 19.
Figures 22, 23:
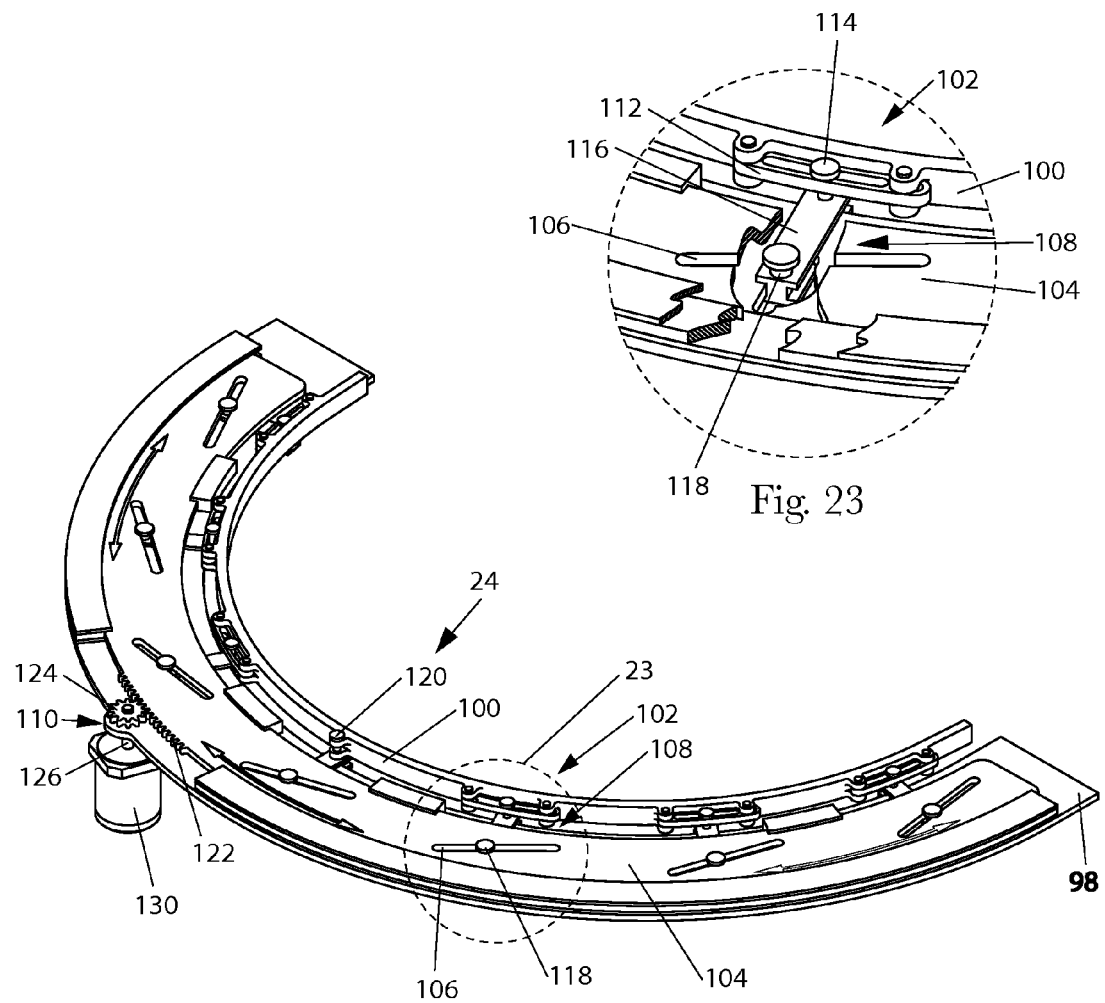
FIG. 22 is a perspective view of an adjustable guide rail for the star wheel conveyor.
FIG. 23 is an enlarged, partially cut away perspective view of the adjustment mechanism for the adjustable guide rail shown in FIG. 22.
Figure 24:
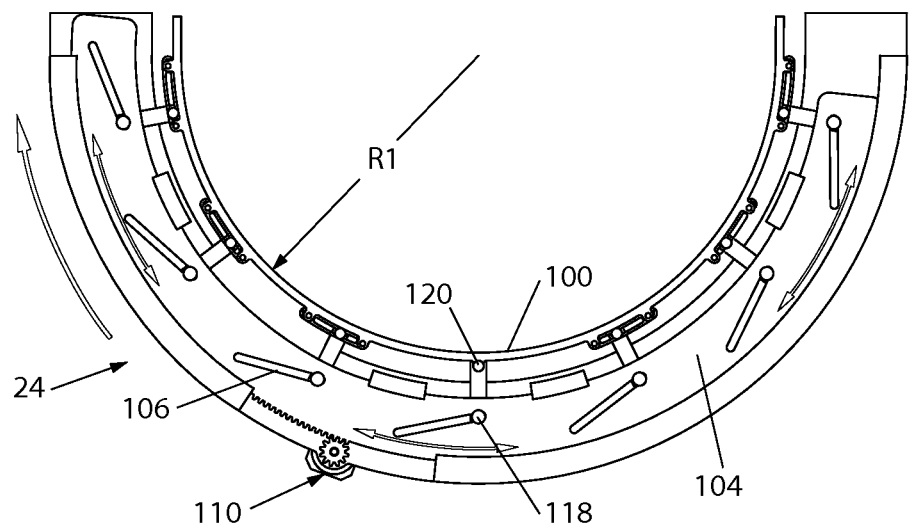
FIG. 24 is a top plan view of the adjustable guide rail shown in FIG. 22, shown with the guide rail adjusted to the minimum diameter.
Figure 25:
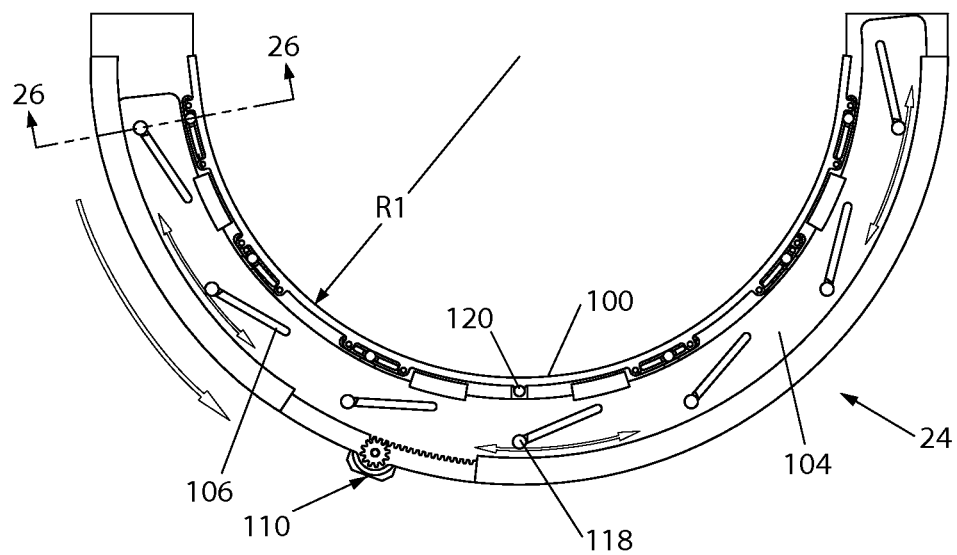
FIG. 25 is a top plan view of the adjustable guide rail shown in FIG. 22, shown with the guide rail adjusted to the maximum diameter.
Figure 26:
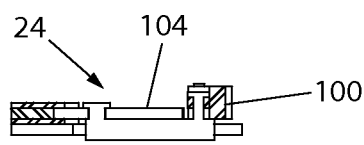
FIG. 26 is a cross-sectional view taken along line 26-26 of FIG. 25.

The number of different keys 82 can be any number greater than one. FIGS. 15 and 16 show four keys 82 for this particular star wheel 20. In the embodiment shown, there are four different keys 82A, 82B, 82C, and 82D, one for each of the holes 80. FIGS. 17 and 21 show one of the keys 82C in an engaged position. FIGS. 18 and 20 show one of the keys 82D in a disengaged position. In FIG. 20, the longer dimension of lobe-shaped cams 86 is pointed toward the viewer. The cams 86 are, thus, not seen as mating with the disks 30 in FIG. 20 since the width of these cams 86 when viewed from this angle is essentially the same as that of the shaft 84. Typically, only one of the keys 82 will be engaged when the star wheel 20 is in use.

In the embodiment shown in FIGS. 15-21, to make a change in the size and/or shape of the pockets 50 to change from one size and/or shape bottle 22 to a different size and/or shape bottle 22, the following sequence is generally followed. The operator squeezes the locking trigger 92 of the handle 88 to unlock the key 82 that is currently engaged. The operator turns the key 82 counter clockwise to disengage the cams 86 on the key 82. When the locking trigger 92 is released, the spring loaded lock prevents further unintended rotation of the key 82. Next, if the key that describes the next bottle size is not installed, the operator installs the desired key 82 by plugging it into any one of the holes 80 (moving another key out of the way first if needed). For the key that describes the next desired bottle, the operator squeezes the locking trigger 92 to unlock the handle and turns the key 82 clockwise to engage the cams 86 with the disks 30. The cams 86 engage the star wheel disks 30 and move the star wheel disks 30 to the desired locations. When the locking trigger 92 is released, a spring loaded lock prevents further unintended rotation of the key.

Numerous variations of this embodiment are possible. For example, in other embodiments, the star wheel 20 can be designed to hold fewer or more keys. In the case with four keys, if a fifth bottle is desired, one key can be removed and a newly-designed fifth key can be installed. This provides flexibility for future articles that may not have been contemplated when the equipment was originally designed.

The reconfigurable star wheel 20 may be adjusted for a new shape and/or size article 22 manually, at least partially automatically, or if desired, fully automatically with the touch of a button. For instance, the adjustable star wheel conveyor 20 may be part of a system that further comprises a computer 26. The computer 26 can be provided with a computer-aided design ("CAD") program in which the CAD program contains the dimensions of a three dimensional article 22 at levels or elevations corresponding to each of the disks 30. The CAD program can be used to determine the necessary rotational angle for each of the disks 30 to create a pocket 50 to support the desired bottle geometry. The process of using the CAD program to determine the star wheel adjustment setting can be automated. For example, the operator can simply input a bottle file into the computer 26 and the automated program will automatically rotate the disks 30 to determine the correct settings. This is much faster than an operator manually manipulating the star wheel 20 and bottle models to determine the correct star wheel settings. The computer 26 can be in communication with the control system that controls the adjustment mechanism, such as the motors 42 to adjust the rotational (or angular) position of each of the star wheel disks 30 to create the pockets 50 to accommodate the dimensions of a three dimensional article 22. The "angular" position of the disks refers to the angle which the disks are rotated relative to an initial position. The CAD program can also be used to generate a table or list of numbers that describe a list of motor positions for each of the star wheel disks 30. This list of positions can be uploaded or manually entered into a programmable logic controller (PLC) that controls the position of each motor 42. A programmable logic controller is a digital computer used for automation of electromechanical processes. The PLC may be a separate device, or it may be incorporated into the computer 26 shown in the drawings. Such an automatic adjustment system is not limited to use with the universally adjustable star wheel conveyors described herein, and may be used with star wheels having any suitable configuration.

The CAD program can alternatively be used to enable manual adjustment of the star wheel 20. For example, in the gear embodiment shown in FIGS. 1-8 and 10, the CAD program can provide a list of numbers that are the adjustment settings for the manual adjustment of the rotational angle of each disk 30. For the wedge mechanism shown in FIGS. 11-14, the CAD program can be used to define the slot geometry. For the cam key mechanism shown in FIGS. 15-21, the CAD program can be used to design the geometry of the key.

The adjustable star wheel conveyor 20 can be provided with a component to counter the centrifugal force that tends to make the articles 22 move out of the pockets 50 when the star wheel 20 rotates in order to retain the articles 22 in position in the star wheel conveyor 20. Components suitable for this purpose include, but are not limited to, adjustable radius guide rails, vacuum cups, and belts.

FIGS. 22-26 show one non-limiting example of a flexible adjustable guide rail assembly 24 to use with the star wheel 20. The adjustable guide rail assembly 24 comprises a base plate or frame 98, an arcuate flexible beam or rail 100 which is adjusted by a guide rail adjustment mechanism 102. The flexible rail 100 is adjusted to conform to a constant radius R1 that establishes the outer path of a bottle or other article 22 held in an adjustable star wheel 20. The guide rail adjustment system 102 can be in any suitable form that is capable of bending the flexible rail 100 into different radii. The radius R1 of the arc may need to be adjusted to accommodate different bottle depths to ensure that the center of the bottle neck will travel along the same arcuate path. This may be important in order to allow the neck of the bottles to line up with a liquid filler/capper. The flexible rail 100 has a fixed length L. The flexible rail 100 can be bent to conform to different radii R1. In order to do so, the length L of the flexible rail 100 must be allowed to float or move in order to accommodate the bending. The flexible rail 100 can be attached to the radius adjustment mechanism 102 at one point and the length allowed to float at other points. The center of the arc followed by the flexible rail 100 is maintained so it is concentric with the star wheel 20.

The flexible rail 100 can be made of any suitable material or combination of materials that can be bent to conform to an arcuate shape of varying diameter. The flexible rail 100 can, for example, be made from: a thermoplastic such as acetyl or ultra high molecular weight polyethylene (UHMW); a metal such as stainless steel; or a composite such as carbon or fiberglass fibers embedded in a resin, a metal beam covered by a low friction plastic covering, or wood.

In the embodiment shown, the guide rail adjustment system 102 comprises: an arcuate cam plate 104 having angled slots 106 therein; at least one adjustable connecting mechanism 108 for connecting the flexible rail 100 to the cam plate 104; and, a manual adjustment control or automatic adjustment control 110. The adjustable connection mechanisms 108 comprise: slotted links 112 that are joined to the flexible rail 100; inner pins 114 disposed within the slotted links 112; control links 116 that join the inner pins 114 to the follower pins 118 movably disposed in the angled slots 106 of the cam plate 104; and, a fixed inner pin 120.

The adjustment control 110 may comprise any suitable type of manual or automatic adjustment mechanism for changing the radius R1 of the flexible rail 100. In the embodiment shown in the drawings, an automatic adjustment mechanism is shown which comprises: a plurality of teeth 122 on the arcuate cam plate 104; a gear 124; a shaft 126; and a motor 130. Such an automatic adjustment control 110 may, but need not, be linked to a computer, such as the computer 26 that establishes the configuration of the pockets 50 of the star wheel 20 for a particular size and shape article 22. In such a case, the computer 26 could be programmed to move the automatic adjustment control 110 to adjust the adjustable guide rail 24 to the desired radius R1 desired for the article 22 defined in the CAD program.

The adjustable guide rail 24 functions as follows. A motor 130 or a manual adjustment knob (which would replace the motor) adjusts the rotational position of the cam plate 104. The angled slots 106 on the cam plate 104 force the follower pins 118 on control links 116 in and out on a co-radial path. The inner pins 114 on the control links 116 form a variable arc. The inner pins 114 are connected to the flexible rail 100 by the slotted links 112. These slotted links 112 allow the flexible rail 100 to float along its length as the radius R1 is adjusted. One point 120 along the flexible rail 100 will be pinned to the control link 116. In the example illustration, the center of the flexible rail 100 is pinned to the control link 116 by fixed pin 120, and the ends of the flexible rail 100 are allowed to float. The pinned position 120 can be relocated to, for instance, one end to prevent movement of the flexible rail 100 at this end.

Such an adjustable guide rail 24 is not limited to use with the universally adjustable star wheel conveyors 20 described herein, and may be used with star wheels having any suitable configuration.

In an alternative embodiment, vacuum cups located on the rotatable elements 30 (such as in the recesses 56) can be used to retain the articles 22 in place instead of an adjustable guide rail 24. The timing of the vacuum cups for transfer of the bottles or other articles 22 can be controlled by a programmable logic controller ("PLC"), or by valves that are actuated by the star wheel position.

The adjustable star wheel 20 may provide a number of advantages. It should be understood, however, that such advantages are not required to be provided unless included in the appended claims. In the embodiment shown, the pockets 50 created by adjusting eight independent disks 30 may provide more flexibility to accommodate various shapes and/or sizes of articles than star wheels described in the patent literature. Independent adjustment of pocket width versus pocket depth with the ramp-shaped pockets 50 (when viewed in plan view) provides more touch points and improved control of bottle position. Independent adjustment of the pocket 50 on each side of the bottle 22 can accommodate asymmetrical bottle shapes. These pockets 50 are infinitely adjustable to any current or future bottle shape versus being adjustable to a limited number of articles of predetermined shapes.

The independent upper and lower four disk stack elevations are able to maintain the vertical axis of bottles or other articles with non-constant cross-sections. Some examples of such articles are bottles with bases larger than their tops or with bases smaller than their tops. The articles also need not have a flat bottom. Tottles (bottles shaped like a tube with no flat bottom) can be transported and controlled. Bottles with an angled neck can be supported with the neck vertical and the body maintained at a non vertical angle.

A design with concentric disks is simple and relatively inexpensive to manufacture and maintain. No complex mechanism is required to achieve amorphous shape capacity and adjustable pocket depth. It is practical to adjust this system either using manual or fully automatic means. Fully automatic adjustment enables a size and/or shape change driven fully by the command of online software.

Figure 27:
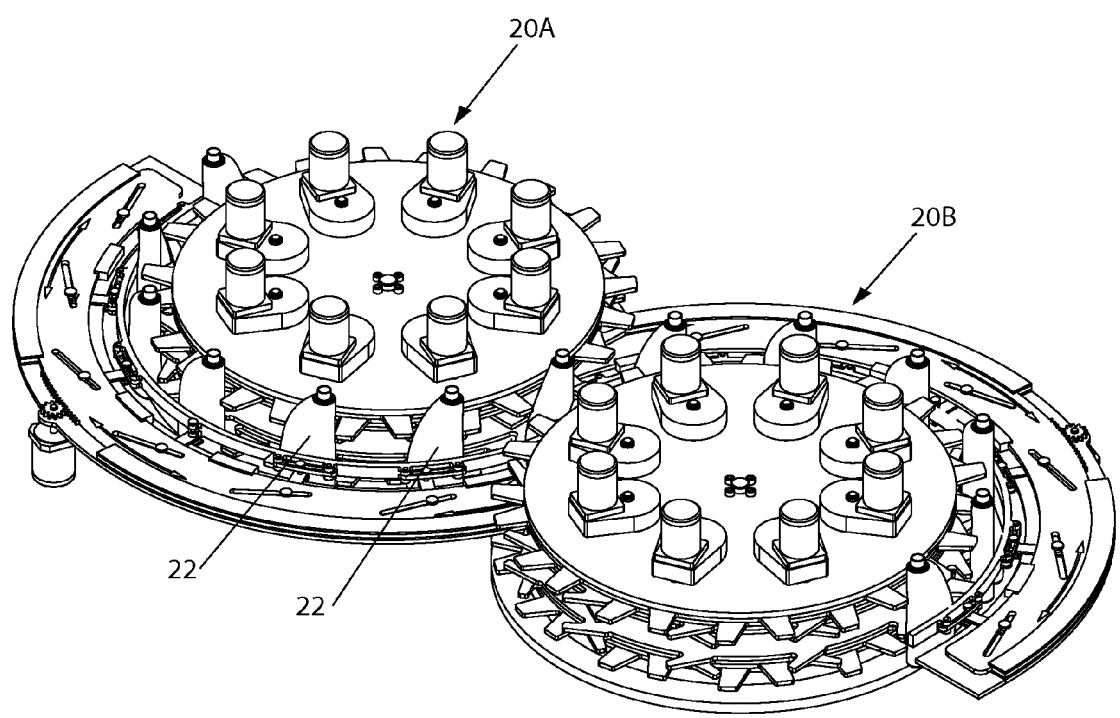
FIG. 27 is a schematic perspective view of a pair of adjustable star wheel conveyors capable of transferring articles therebetween.

Numerous other embodiments are possible. As shown in FIG. 27, in one embodiment, a system is provided comprising a pair of adjustable star wheels 20A and 20B wherein the star wheels are adjacent, and in operation said star wheels rotate in opposite directions so that one star wheel can transfer a three dimensional article to the other star wheel. The pockets can be adjusted differently for alternating star wheels to handle asymmetrical articles.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "90 degrees" is intended to mean "about 90 degrees".

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of automatically adjusting an adjustable star wheel for conveying three dimensional articles within pockets along an arcuate path, wherein the adjustable star wheel comprises stacked concentric rotatable elements having a center and peripheries, and comprising control surfaces that define the boundaries of said pockets, wherein the pockets defined by control surfaces of said rotatable elements have an adjustable configuration to accommodate different size and/or shape three dimensional articles, and an adjustment mechanism for adjusting the configuration of the pockets by adjusting the relative angular position between rotatable elements, the method comprising:

providing a computer with a computer-aided design software program, said computer being in communication with the adjustment mechanism, and providing a model of the adjustable star wheel including rotatable elements and control surfaces in said computer-aided design software;

providing a model of the three dimensional article within the computer-aided design software;

adjusting the relative angles of the model of the rotatable elements to enable the control surfaces to cooperate with the model of the three dimensional article and form a pocket to support the three dimensional article within said computer-aided design software; and adjusting the relative angles of the rotatable elements of the adjustable star wheel to match the configuration of the model of the rotatable elements determined to support the model of the three dimensional article in the computer-aided design software.

2. The method of claim 1 wherein the adjustment mechanism comprises at least one motor, and adjusting the relative angles of the rotatable elements is accomplished by using one or more motors to independently rotate the individual rotatable elements.

3. The method of claim 2 wherein adjusting the relative angles of the rotatable elements is automatically accomplished by a control system which commands the motor to rotate a rotatable element to a predetermined angular position.

4. The method of claim 3 wherein the predetermined angular position for the rotatable element is input to the motor control system by a human operator.

5. The method of claim 3 wherein the motor control system communicates directly with the computer-aided design software to provide a commanded position for rotatable elements.

6. The method of claim 2 wherein the motor is mechanically coupled to a first gear and a mating second gear is mechanically coupled to one of said rotatable elements, and the first gear is a gear that can be turned by the motor to rotate the second gear and the corresponding rotatable element.

7. The method of claim 1 wherein adjusting the relative angles of the rotatable elements is accomplished by manual adjustment.

8. The method of claim 1 wherein adjusting the relative angles of the model of the rotatable elements to enable control surfaces to cooperate with the model of the three dimensional article and form the pocket to support the three dimensional article within said computer-aided design software is autonomously carried out by the software without the need for a human operator.

9. The method of claim 8 wherein the motor control system communicates directly with the software that autonomously adjusted the model of the rotatable elements using computer-aided design software to provide commanded position for rotatable elements.

* * * * *